(12) United States Patent
Tawakol et al.

(10) Patent No.: US 10,650,412 B2
(45) Date of Patent: May 12, 2020

(54) MULTI-PROFILE TRACKING IDENTIFICATION OF A MOBILE USER

(71) Applicant: BLUE KAI, INC., Seattle, WA (US)

(72) Inventors: Omar Tawakol, Los Altos, CA (US);
David Abraham Wiener, San Francisco, CA (US); Fang Fang, Cupertino, CA (US); Jason Leon Walsh, Seattle, WA (US); Raja Bishara Daoud, San Jose, CA (US); Jeffrey Charles Frantz, Dublin, CA (US)

(73) Assignee: BLUE KAI, INC., Seattle, WA (US)

( * ) Notice: Subject to any disclaimer, the term of this patent is extended or adjusted under 35 U.S.C. 154(b) by 0 days.

(21) Appl. No.: 13/918,091

(22) Filed: Jun. 14, 2013

(65) Prior Publication Data
US 2014/0372224 A1    Dec. 18, 2014

(51) Int. Cl.
*G06F 7/00*      (2006.01)
*H04L 29/08*   (2006.01)
*G06Q 30/02*   (2012.01)

(52) U.S. Cl.
CPC .......... *G06Q 30/0269* (2013.01); *G06F 7/00* (2013.01); *H04L 29/0809* (2013.01)

(58) Field of Classification Search
CPC .... G06Q 30/0269; G06F 7/00; H04L 29/0809
See application file for complete search history.

(56) References Cited

U.S. PATENT DOCUMENTS 6,253,203 B1 *  6/2001  O'Flaherty ......... G06F 21/6245
6,314,492 B1    11/2001  Allen
(Continued)

OTHER PUBLICATIONS

AdExchanger.com, 41st Parameter Solving Cookie Concerns With AdTruth Says Founder Eisen, Oct. 4, 2011—12:57 am, http://web.archive.org/web/20120106172855/http://www.adexchanger.com/online-advertising/the-41st-parameter, entire document.*

(Continued)

*Primary Examiner* — Eric R Netzloff
*Assistant Examiner* — Dipen M Patel
(74) *Attorney, Agent, or Firm* — Kilpatrick Townsend & Stockton LLP

(57) ABSTRACT

Embodiments are directed towards employing multiple profiles to track identification of users across multiple domains. Multiple application-domain profiles and multiple web-domain profiles may each include a statistical identifier. A profile enrichment store may be generated from the application-domain profiles and web-domain profiles, where each entry in the profile enrichment store may be based on statistical identifiers. The profile enrichment store may be utilized to determine categories associated with a statistical identifier for a request from a client device. A targeted advertisement may be determined based on the determined category and may be provided to the client device. A client caching identifier may be used in a mobile web domain, in combination with the statistical identifier, to track mobile web users. If a request is associated with a profile that includes an affirmative opt-out flag, categories in the profile enrichment store for a corresponding statistical identifier may be cleaned up.

24 Claims, 10 Drawing Sheets

(56) References Cited

U.S. PATENT DOCUMENTS

| | | | |
|---|---|---|---|
| 8,069,176 B1* | 11/2011 | Ioffe | G06F 17/30799 707/747 |
| 8,352,319 B2* | 1/2013 | Wang et al. | 705/14.53 |
| 8,364,682 B1* | 1/2013 | Gershony et al. | 707/739 |
| 8,438,184 B1* | 5/2013 | Wang et al. | 707/780 |
| 8,843,514 B1* | 9/2014 | Moonka et al. | 707/769 |
| 8,909,202 B2 | 12/2014 | Luna | |
| 9,049,076 B1* | 6/2015 | Ramachandran | H04L 67/22 |
| 9,049,175 B2 | 6/2015 | Russo et al. | |
| 2006/0116921 A1 | 6/2006 | Shan | |
| 2008/0109307 A1* | 5/2008 | Ullah | 705/14 |
| 2010/0198911 A1* | 8/2010 | Zhang et al. | 709/203 |
| 2011/0022661 A1* | 1/2011 | Alsina | G06Q 10/109 709/205 |
| 2011/0060905 A1* | 3/2011 | Stack | G06Q 10/10 713/167 |
| 2011/0231240 A1* | 9/2011 | Schoen et al. | 705/14.41 |
| 2012/0047022 A1* | 2/2012 | Shamim et al. | 705/14.66 |
| 2012/0198268 A1* | 8/2012 | Qureshi | G06F 11/1443 714/4.1 |
| 2012/0324094 A1* | 12/2012 | Wyatt | H04W 4/60 709/224 |
| 2013/0014136 A1* | 1/2013 | Bhatia | H04N 21/252 725/9 |

OTHER PUBLICATIONS

Official Communication received in U.S. Appl. No. 13/918,132, dated Nov. 6, 2013.
Google Analytics, Tracking Muliple Domains, May 28, 2012, https://developers.google.com/analytics/devguides/collection/gajs/gaTrackingSite.
U.S. Appl. No. 13/918,132; Non-Final Office Action dated Nov. 6, 2013.
U.S. Appl. No. 13/918,132; Final Office Action dated Apr. 18, 2014.
Advisory Action dated Jun. 27, 2014 for U.S. Appl. No. 13/918,132, 3 pages.
Non-final Office Action dated Dec. 26, 2014 for U.S. Appl. No. 13/918,132.
Final Office Action dated Apr. 20, 2015 for U.S. Appl. No. 13/918,132.
Non-final Office Action dated Sep. 25, 2015 for related U.S. Appl. No. 13/918,132.
Final Office Action dated Apr. 20, 2016 for related U.S. Appl. No. 13/918,132.
"How We are Different," AdTruth.com, last accessed Sep. 3, 2013 http://www.adtruth.com/what-we-do/differentiators.
U.S. Appl. No. 13/918,132, Advisory Action dated Jul. 11, 2016, 4 pages.
U.S. Appl. No. 13/918,132, Non-Final Office Action dated Jan. 3, 2019, 13 pages.

* cited by examiner

US 10,650,412 B2

MULTI-PROFILE TRACKING IDENTIFICATION OF A MOBILE USER

TECHNICAL FIELD

The present invention relates generally to managing online user data, and more particularly, but not exclusively, to tracking the identification of mobile users across domains based on multiple profiles.

BACKGROUND

The online advertising industry typically utilizes user data to provide targeted advertising campaigns that can optimize ad placement, ad content, real-time bidding, and the like. This user data can be collected for groups of individuals, and it can include demographic data (e.g., gender, age, race), psychographic data (e.g., interests, opinions), geographic data (e.g., zip code, state, country), in-market data (e.g., users' interest in luxury cars, travel to Polynesia), as well as social media data. These various types of user data may be collected and tracked based on an identification of a user, such as by employing a cookie. Additionally, this user data may be collected from multiple sources, such as, for example, internet activities, applications, or the like.

Current advancements in mobile devices and mobile platforms have increased the amount of time users spend on their mobile device, to browse internet content and/or utilize mobile applications. However, some mobile devices and/or platforms limit historical methods of tracking user identification, such as, for example, cookies. Similarly, different mobile domains may utilize different identification means. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
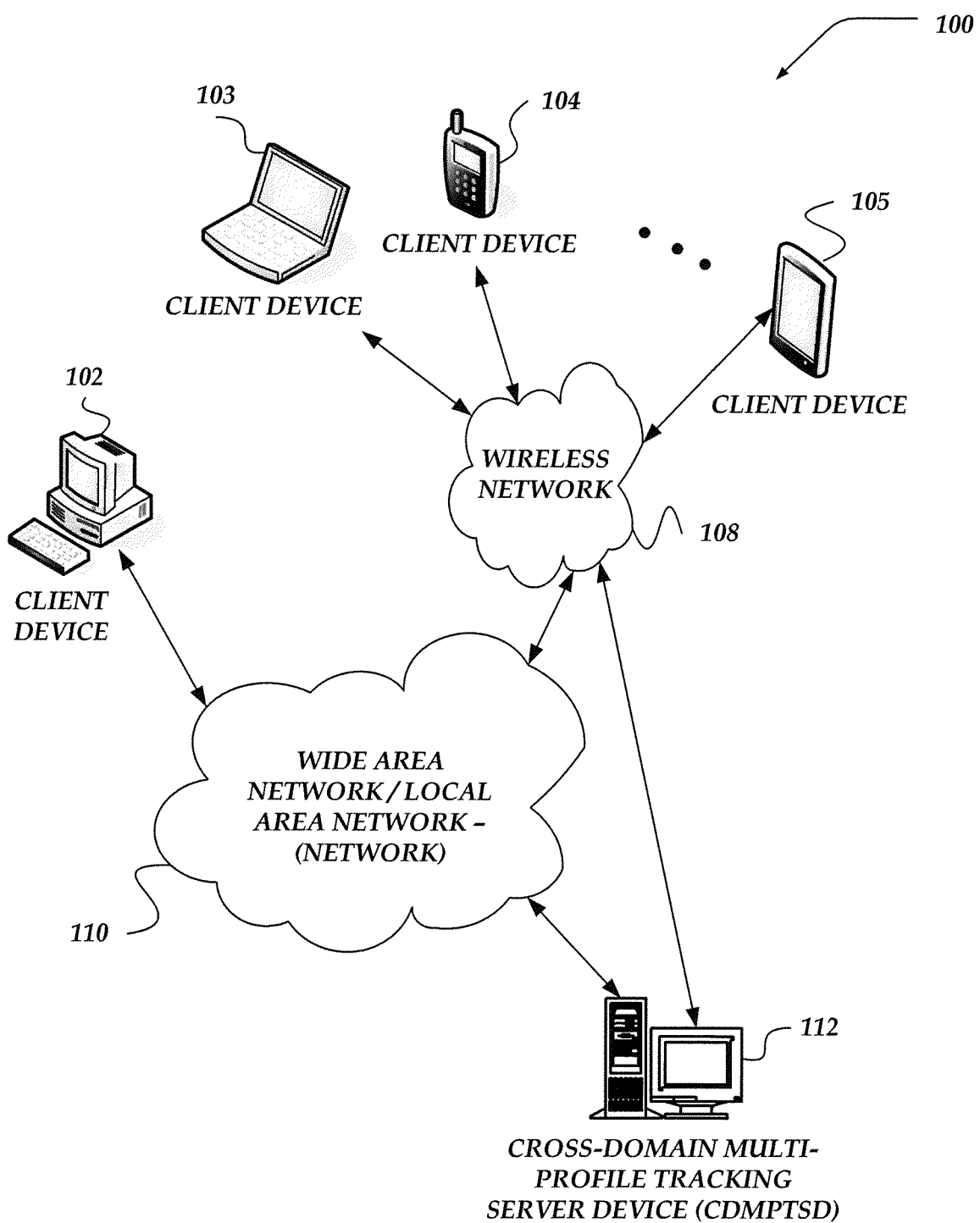
FIG. 1 is a system diagram of an environment in which embodiments of the invention may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification, claims, and drawings, the following terms take the meanings explicitly described, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "cross domain multi-profile tracking approach" or "CDMPTA" may refer to an application (software, hardware, or some combination) that is arranged to manage and bridge user activities from multiple domains (mobile app, mobile web, online, etc) via server side profiles. This monitoring may be performed to collect user data, determine and/or generate user profiles, provide targeted advertising, maintain separate profile stores (e.g., a mobile application profile store, a mobile web profile store, and a profile enrichment store), or the like, or any combination thereof. In some embodiments, the CDMPTA may be employed by a intermediate device, server device, or other network device. In at least one embodiment, the CDMPTA may enable client device tracking, including mobile device tracking, on the server side, rather than on the client side (such as with cookies).

In some embodiments, the CDMPTA may provide real-time (e.g., in-band) monitoring/analysis and/or non-real-time monitoring/analysis (e.g., out-of-band). For example, in some embodiments, the CDMPTA may monitor a request from a client device, and in real-time determine and provide a targeted advertisement to the client device. In another example, the CDMPTA may determine and/or provide the targeted advertisement to the client device at a later date and/or time (e.g., sending an advertisement to client device at a later date).

As used herein, the phrase "user data" generally refers to information about one or more users. User data may include geographic information, one or more attributes, and/or any combination thereof. As used herein, the term "attribute" generally refers to a type information and/or characteristic of user data. Attributes may include, but are not limited to, age; gender; occupation; location; other demographic information; applications utilized by a user; a user's online or offline behaviors and actions; direct or indirect communications and/or predispositions towards or predilection for certain products, events, or entities; and/or direct or indirect indications of a user's affinity, inclusion or exclusion in certain groups or categories, or the like. Such online behavior may include, but is not limited to, browsing, searching, purchasing, or the like. Lack of a particular behavior and/or a negative affinity could also be used as an attribute. Attributes may also include characteristic of a device utilized by a user, such as, but not limited to, device capabilities, device identifiers, or the like. In some embodiments, user data may be referred to as tagging information, which may be used to generate targeted advertisements.

The term attribute may also refer to campaigns seen or experienced by a user. Such campaigns may include an advertising campaign, a promotional campaign, an informational campaign, or the like. Such campaigns may be experienced by a user through online advertisements placed on web sites or other web services, including email, SMS, IM messages or the like; or other offline advertisements in virtually any medium, including but not limited to television, radio, print, physical displays, and the like.

As used herein, the term "category" generally refers to a subject, a behavior, a topic, or type of user data. For example, data for a person who purchased an SUV may be associated with a category of "SUV consumer" and/or broader categories of "automobile consumer" or "light truck consumer." Further, categories may be associated with broad category types. For example, categories related to particular markets for goods and/or services may be classified into a market or in-market type of category. Demographic type categories may include categories related to virtually any demographic statistic, including but not limited to age and gender of a person. Location type categories may be related to geographical location definitions of varying scope. For example, location type categories may include "United States residents", "west coast U.S. residents", "California residents", "Los Angeles County residents", "Burbank residents", and so forth. Seasonal category types may include categories related to particular times of year, seasons, periods of time, and the like. For example, data related to user activities during the winter may be classified in a winter category. Other types of categories may be supported by embodiments without departing from the scope or spirit of the claimed invention. In some embodiments, categories may be a particular type of user data that may used as tagging information, which may be used to generate targeted advertisements.

As used herein, the term "content" refers to any online information and/or data that can be provided to a user including textual, graphical, and/or audio content. This online content may include video, images, animation, audio files, texts, instant messages, emails, documents, posters, letters, or the like that can be used for promotions, advertisements, distribution of product information, discounts, coupons, or the like. Content may include or be part of advertisements, advertising campaigns, targeted advertisements, or the like, As used herein, the phrase "user profile" may refer to information about a user. Such information may include, but is not limited to, user data, categories, one or more identifiers, an opt-out status, time-stamp, or the like. In some embodiments, the identifiers may include a unique, semi-unique, or non-unique identifier of the profile. In some embodiments, this identifier may be referred to as a universal unique identifier (UUID) (although it could be semi-unique or non-unique), which can be used to track a user profile. In at least one embodiment, a user profile may include a statistical identifier. In at least one of various embodiments, a semi-unique identifier may refer to an identifier that can be associated with more than one client device, user profile, user, or the like, within a predetermined constraint. For example, in some embodiments, the predetermined constraint may be based on a number of bytes or characters used as the identifier. In at least one embodiment, a semi-unique identifier may be associated with no less than 1024—or some other regulatory standard, advertising industry standard, or predetermined number of—client devices, user profiles, users, or the like. In some other embodiments, if cookies or other persistent identification mechanisms are enabled on a client device, then these mechanisms may be utilized as the UUID for a user profile.

As used herein, the phrase "opt-out status" may refer to a logical true/false status of a user profile that may indicate whether a user associated with the user profile has selected to opt out of profile tracking. In some embodiments, a user may be enabled to opt out of profile tracking through a website registration process, through a client device setting (e.g., an operating system setting), an application setting, before, during, or after an application download, or the like.

As used herein, the term "statistical identifier" may refer to an identifier of a client device generated from information obtained from or regarding the client browser or client device. In various embodiments, this information may be obtained by a CDMPTA that is monitoring (either actively or passively) communications between endpoints. In other embodiments, this information may be obtained from third parties (e.g., a mobile device manufacturer, a network service provider, or the like). In at least one of various embodiments, one or more parameters associated with the client device may be employed to determine the statistical identifier. In some embodiments, this information may be obtained or accessible from a browser executing on the client device, metadata of an http request sent from the client device, or the like. Examples of such parameters may include, but are not limited to, a user agent (e.g., type and/or version of operating system executing on the client device), IP address, or the like, or any combination thereof. In at least one of various embodiments, the statistical identifier may also be referred to as a cross-domain identifier. In some other embodiments, the statistical identifier may be a predetermined identifier that can be utilized by multiple domains.

In some embodiments, the statistical identifiers may be determined, modified, or updated based on heuristics of previously stored information. In at least one of various embodiments, previous values may be utilized as comparisons to adjust for anomalies when determining a statistical identifier. For example, if a particular IP address is historically used in conjunction with a particular user agent and suddenly a different user agent is used for the same IP address, then this change may indicate that a statistical identifier determined from this information may be incorrect or unreliable. However, embodiments are not so limited and other mechanisms or device fingerprinting technologies may be employed to determine statistical identifiers.

As used herein, the phrase "web domain profile" may refer to a user profile that is generated, accessible, maintained, or otherwise managed, by a web browser. In at least one of various embodiments, at least a portion of the information within a web domain profile (e.g., user data or categories) may be provided by or through the web browser. In some embodiments, this web browser may be a mobile web browser (i.e., a web browser on a mobile device), where the user profile may be referred to as a mobile web domain profile. In at least one of various embodiments, the UUID of a web domain profile may be generated based on a statistical identifier and a client caching identifier (e.g., a hash of these two identifiers). In some embodiments, the client caching identifier may be generated by a server device and sent to a client device for storage in the cache of the client device. In at least one of various embodiments, the client caching identifier may be associated with a timestamp stored by the sever device (or at least stored on the server side).

As used herein, the phrase "application domain profile" may refer to a user profile that is generated, accessible, maintained, or otherwise managed, by one or more applications (other than web a browser). In at least one of various embodiments, at least a portion of the information within a application domain profile (e.g., user data or categories) may be provided by or through at least one application. In some embodiments, these applications may be mobile applications or mobile apps (i.e., an application executing and/or operating on a mobile device), where the user profile may be referred to as a mobile application domain profile. In at least one embodiment, the UUID of an application domain profile may be a unique identifier. In some embodiments, a software development kit may enable an application to access a specific device identifier, such as a Unique Device Identifier (UDID), Identifier for Advertising (IFA), or the like. The UDID may be an identifier that is unique to a client device, such as, for example, a serial number of a client device. The IFA may be an identifier provided to a client device for use in tracking user/device activity for providing targeted advertisements. In some embodiments, an application domain profile may include a statistical identifier that is separate and/or distinct from the UUID.

As used herein, the phrase "web profile store" or "web domain profile store" may refer to a database or other data structure that may maintain and/or store a plurality of web domain profiles from a plurality of client devices and/or users.

As used herein, the phrase "application profile store" or "application domain profile store" may refer to a database or other data structure that may maintain and/or store a plurality of application domain profiles from a plurality of client devices and/or users.

As used herein, the phrase "profile enrichment store" may refer to a database or other structure that may maintain and/or store at least a plurality of statistical identifiers and their associated categories. In some embodiments, the profile enrichment store may maintain a list of categories for each statistical identifier based on a plurality of web domain profiles (or the web profile store) and a plurality of application domain profiles (or the application profile store).

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to employing a plurality of profiles to track an identification of mobile users across a plurality of domains. Users often utilize many different domains of a client device, such as a web domain, application domain, or the like. Each of these different domains may utilize and/or enable different tracking identifiers and/or mechanisms. In some embodiments, a plurality of application domain profiles and a plurality of web domain profiles may be provided. Each of the application domain profiles and each of the web domain profiles may include at least an associated statistical identifier. In some embodiments one or more of the profiles may include at least one associated category. In other embodiments, one or more profiles may fail to include an associated category, such as, for example, if a user associated with a profile chooses to clean-up tagging via registry (e.g., the user requests the categories be reset or deleted from the profile), before the user qualifies for a category (e.g., before enough information is available to determine a category), after the user opts out of tracking, or the like.

In at least one embodiment, an application domain profile store may be generated from the plurality of application domain profiles. In another embodiment, a web domain profile store may be generated from the plurality of web domain profiles. A profile enrichment store may be generated from the plurality of application domain profiles and the plurality of web domain profiles. In at least one of various embodiments, each entry in the profile enrichment store may be based on the statistical identifiers and associated categories for each profile.

In some embodiments, a content request may be received from a client device. This request may be for a website/webpage, an application download, an in-application purchase, an in-application advertisement click through, other content, or the like. A statistical identifier may be determined based on the content request. In some embodiments, the statistical identifier may be determined based on factors or information retrievable and/or common in both the web domain and the application domain. In at least one various embodiments, the statistical identifier may be utilized—along with other information (e.g., client caching identifier)—to track a profile (e.g., in the web domain). In another one of the various embodiments, the statistical identifier may be determined and maintained for bridging between domains, but may not be utilized to track a profile (e.g., in the application domain, which may be tracked by device identifier). The profile enrichment store may be employed to determine at least one category for the content request, such that the determined category is associated with the statistical identifier of the request. Based on this determined category, a targeted advertisement may be determined and provided to the client device.

In other embodiments, a request from a client device may be associated with a user profile that includes an affirmative opt-out status indication. If such a request is received, the profile enrichment store may be updated and/or cleaned-up to remove or purge categories associated with the opted-out profile (e.g., by utilizing a statistical identifier associated with the request to determine which entry in the profile enrichment store to update). In at least one embodiment, all categories associated with the entry in the profile enrichment store that is associated with the request may be removed or purged. This entry in the profile enrichment store may be re-established or re-populated based on subsequent requests that are associated with a negative opt-out flag.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client devices 102-105, and Cross Domain Multi-profile Tracking Server Device (CDMPTSD) 112.

At least one embodiment of client devices 102-105 is described in more detail below in conjunction with FIG. 2. In one embodiment, at least some of client devices 102-105 may operate over a wired and/or wireless network, such as networks 110 and/or 108. Generally, client devices 102-105 may include virtually any computing device capable of communicating over a network to send and receive information, perform various online activities, offline actions, or the like. In one embodiment, one or more of client devices 102-105 may be configured to operate within a business or other entity to perform a variety of services for the business or other entity. For example, client devices 102-105 may be configured to operate as a web server, an accounting server, a production server, an inventory server, or the like. However, client devices 102-105 are not constrained to these services and may also be employed, for example, as an end-user computing node, in other embodiments. It should be recognized that more or less client devices may be included within a system such as described herein, and embodiments are therefore not constrained by the number or type of client devices employed.

Devices that may operate as client device 102 may include devices that typically connect using a wired or wireless communications medium such as personal computers, multiprocessor systems, microprocessor-based or programmable electronic devices, network PCs, or the like. In some embodiments, client devices 102-105 may include virtually any portable personal computing device capable of connecting to another computing device and receiving information such as, laptop computer 103, smart mobile telephone 104, and tablet computers 105, and the like. However, portable computing devices are not so limited and may also include other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like. As such, client devices 102-105 typically range widely in terms of capabilities and features. Moreover, client devices 102-105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send content between another computing device. The client application may include a capability to send and/or receive content, or the like. The client application may further provide information that identifies itself, including a type, capability, name, and the like. In one embodiment, client devices 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client devices, CDMPTSD 112, or other computing devices.

Client devices 102-105 may further be configured to include a client application that enables an end-user to log into an end-user account that may be managed by another computing device, such as CDMPTSD 112, or the like. Such end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple client devices 103-105 and its components with network 110. Wireless network 108 may include any of a variety of wireless sub-networks that may further overlay stand-alone ad-hoc networks, and the like, to provide an infrastructure-oriented connection for client devices 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile devices, such as client devices 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client devices 103-105 and another computing device, network, and the like. In some embodiments, client devices 103-105 may be enabled to communicate with CDMPTSD 112 via wireless network 108.

Network 110 is configured to couple network devices with other computing devices, including, CDMPTSD 112, client device 102, and client devices 103-105 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of CDMPTSD 112 is described in more detail below in conjunction with FIG. 3. Briefly, however, CDMPTSD 112 may be an embodiment of a cross domain multi-profile tracking approach. CDMPTSD 112 may include virtually any network device capable of managing a plurality of profile stores, which may include, but is not limited to, an application profile store, a web profile store, a profile enrichment store, or the like. In at least one embodiment, CDMPTSD 112 may generate a profile enrichment store that includes at least statistical identifiers and one or more associated categories from the application profile store and web profile store. In some embodiments, CDMPTSD 112 may enable a user to opt out of having one or more of their profiles tracked. Devices that may be arranged to operate as CDMPTSD 112 include various network devices, including, but not limited to personal computers, desktop computers, multiprocessor systems, microprocessor-based or programmable consumer electronics, network PCs, server devices, network appliances, and the like.

Although FIG. 1 illustrates CDMPTSD 112 as a single computing device, the invention is not so limited. For example, one or more functions of the CDMPTSD 112 may be distributed across one or more distinct network devices. Moreover, CDMPTSD 112 is not limited to a particular configuration. Thus, in one embodiment, CDMPTSD 112 may contain a plurality of network devices. In another embodiment, CDMPTSD 112 may contain a plurality of network devices that operate using a master/slave approach, where one of the plurality of network devices of CDMPTSD 112 operates to manage and/or otherwise coordinate operations of the other network devices. In other embodiments, the CDMPTSD 112 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
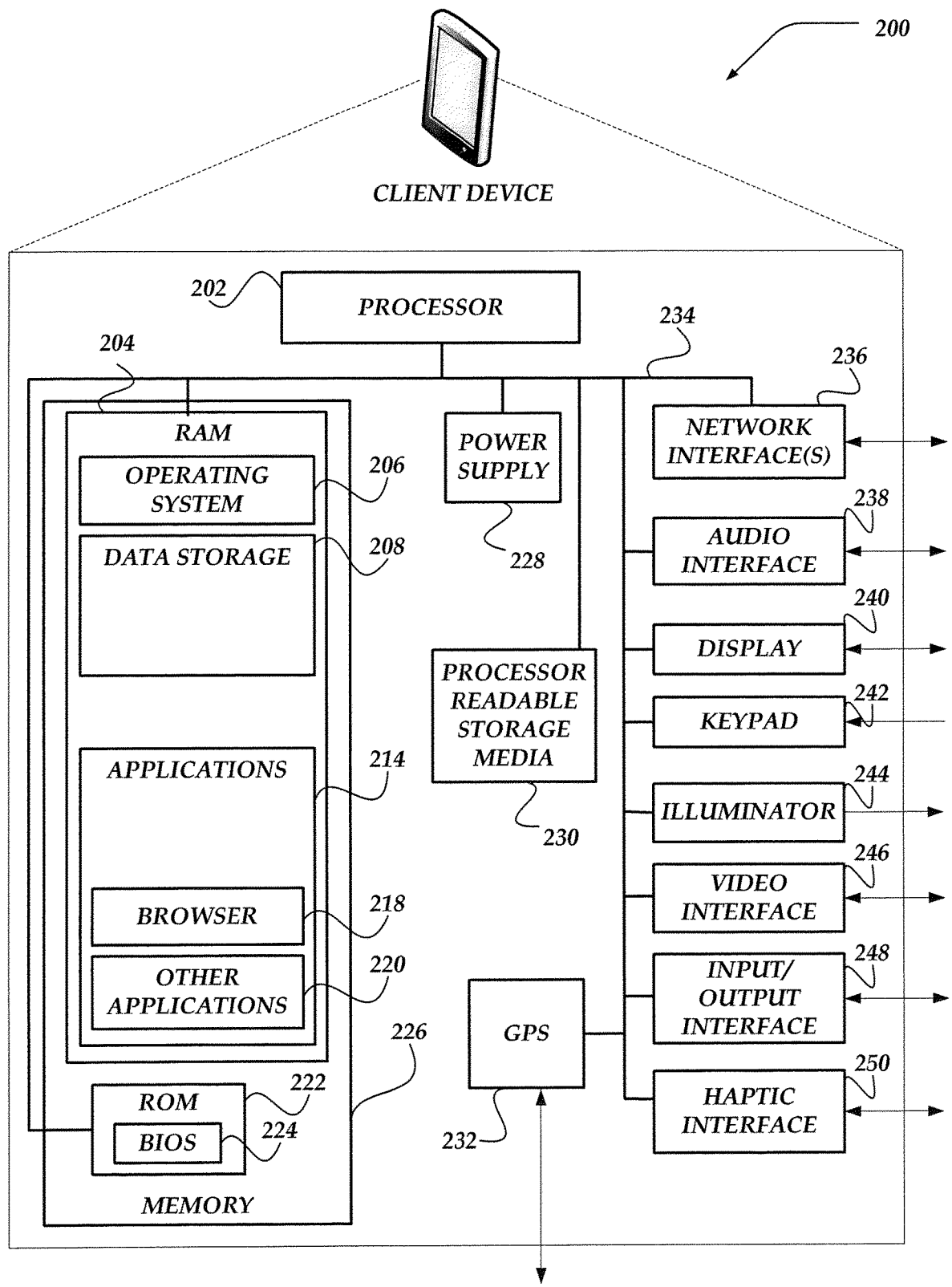
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-105 of FIG. 1.

As shown in the figure, client device 200 includes a processor 202 in communication with a mass memory 226 via a bus 234. In some embodiments, processor 202 may include one or more central processing units (CPU). Client device 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client device 200. A rechargeable or non-rechargeable battery may be used to provide power. The power may also be provided by an external power source, such as an alternating current (AC) adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad

242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client device. For example, the haptic interface 250 may be employed to vibrate client device 200 in a particular way when another user of a computing device is calling. In some embodiments, haptic interface 250 may be optional.

Client device 200 may also include GPS transceiver 232 to determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224 for controlling low-level operation of client device 200. The mass memory also stores an operating system 206 for controlling the operation of client device 200. It will be appreciated that this component may include a general-purpose operating system such as a version of UNIX, or Linux™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store message, we page content, or any of a variety of user generated content. At least a portion of the information may also be stored on another component of network device 200, including, but not limited to processor readable storage media 230, a disk drive or other computer readable storage devices (not shown) within client device 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. Processor readable storage media 230 may also be referred to herein as computer readable storage media and/or computer readable storage device.

Applications 214 may include computer executable instructions which, when executed by client device 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client device. Applications 214 may include, for example, browser 218, and other applications 220. Other applications 220 may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to communicate with another network device, such as CDMPTSD 112 of FIG. 1.

Illustrative Network Device

Figure 3:
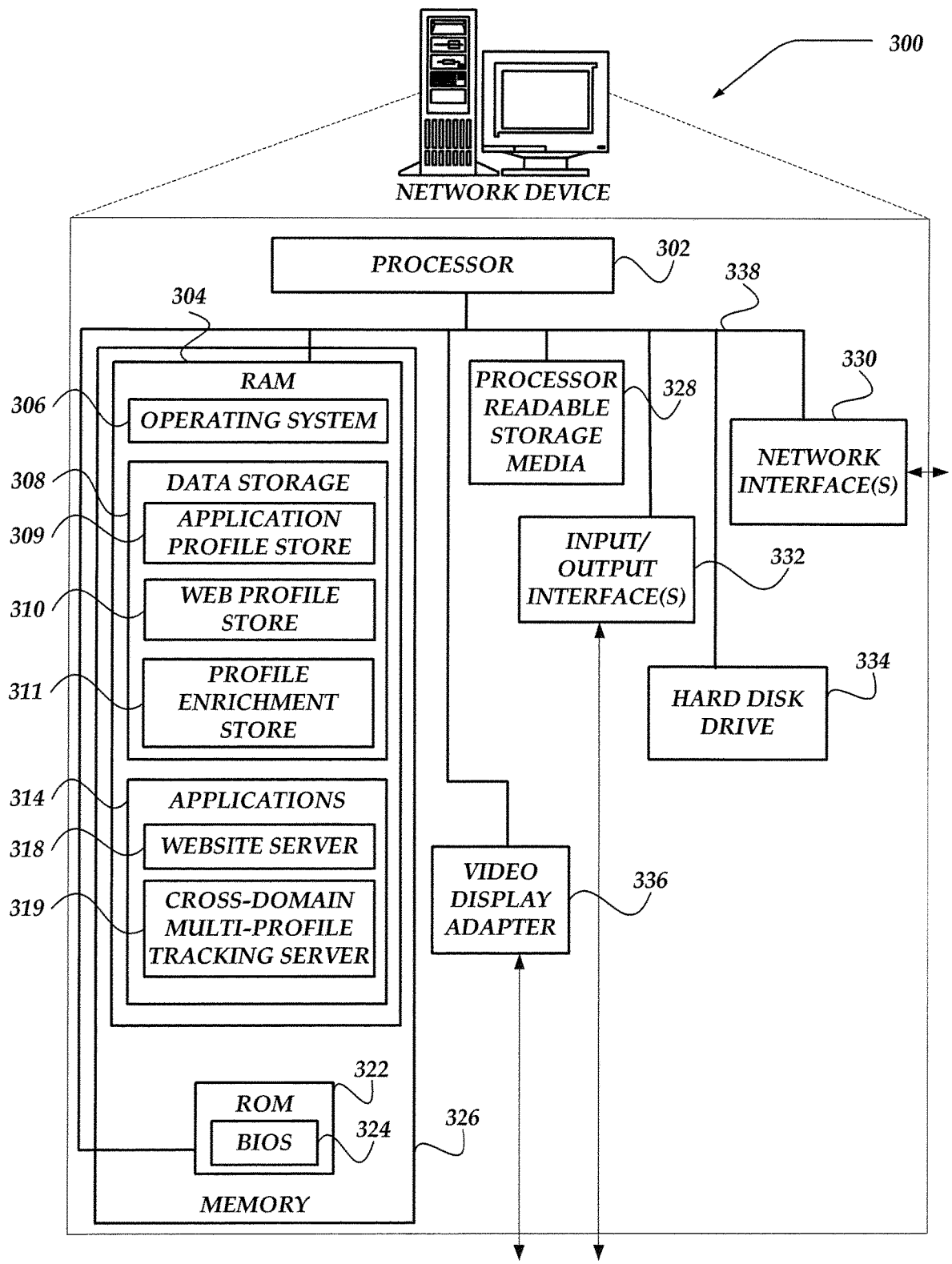
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, a host, or any other device. Network device 300 may represent, for example CDMPTSD 112 of FIG. 1 and/or other network devices.

Network device 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network device 300. Any general-purpose operating system may be employed. Basic input/output system (BIOS) 324 is also provided for controlling the low-level operation of network device 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 326 further includes one or more data storage 308, which can be utilized by network device 300 to store, among other things, applications 314 and/or other data. For example, data storage 308 may also be employed to store information that describes various capabilities of network device 300. The information may then be provided to another device based on any of a variety of events, including being sent as part of a header during a communication, sent upon request, or the like. Data storage 308 may also be employed to store messages, web page content, or the like.

At least a portion of the information may also be stored on another component of network device 300, including, but not limited to processor readable storage media 328, hard disk drive 334, or other computer readable storage medias (not shown) within client device 300

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network device 300, including, but not limited to processor-readable storage media 328, hard disk drive 334, or the like.

Data store 308 may also include application profile store 309, web profile store 310, and/or profile enrichment store 311. Application profile store 309 may store or maintain a plurality of application domain profiles. Web profile store 310 may store or maintain a plurality of web domain profiles. Profile enrichment store 311 may maintain a plurality of entries based on statistical identifiers, where each entry is a different statistical identifier. In some embodiments, profile enrichment store 311 may also include a list categories for each statistical identifier, where the categories are determined based on categories in profiles with a same statistical identifier in application profile store 309 and/or web profile store 310.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include website server 318 and Cross-Domain Multi-Profile Tracking Server (CDMPTS) 319.

Website server 318 may represents any of a variety of information and services that are configured to provide content, including messages, over a network to another computing device. Thus, website server 318 can include, for example, a web server, a File Transfer Protocol (FTP) server, a database server, a content server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

CDMPTS 319 may be configured to manage a plurality of profile stores (e.g., application profile store 309, web profile store 310, and/or profile enrichment store 311). In at least one embodiment, CDMPTS 319 may generate profile enrichment store 311 from application profile store 309 and/or web profile store 310. In other embodiments, MPTS 319 may determine targeted advertisements to provide to a client device based on profile enrichment store 311. In some embodiments, CDMPTS 319 may be employed by CDMPTSD 112 of FIG. 1. In at least one of various embodiments, CDMPTS 319 may be separate and distinct from website server 318, such that the cross domain tracking of user profiles by CDMPTS 319 does not depend on and/or utilize website server 318. In any event, CDMPTS 319 may employ processes, or parts of processes, similar to those described in conjunction with FIGS. 4-7, to perform at least some of its actions.

General Operation

The operation of certain aspects of the invention will now be described with respect to FIGS. 4-8. In at least one of various embodiments, processes 400, 500, 600, 700, and 800 described in conjunction with FIGS. 4-8, respectively, may be implemented by and/or executed on a single network device, such as network device 300 of FIG. 3. In other embodiments, these processes or portions of these processes may be implemented by and/or executed on a plurality of network devices, such as network device 300 of FIG. 3. However, embodiments are not so limited and various combinations of network devices, or the like, may be utilized.

Figure 4:
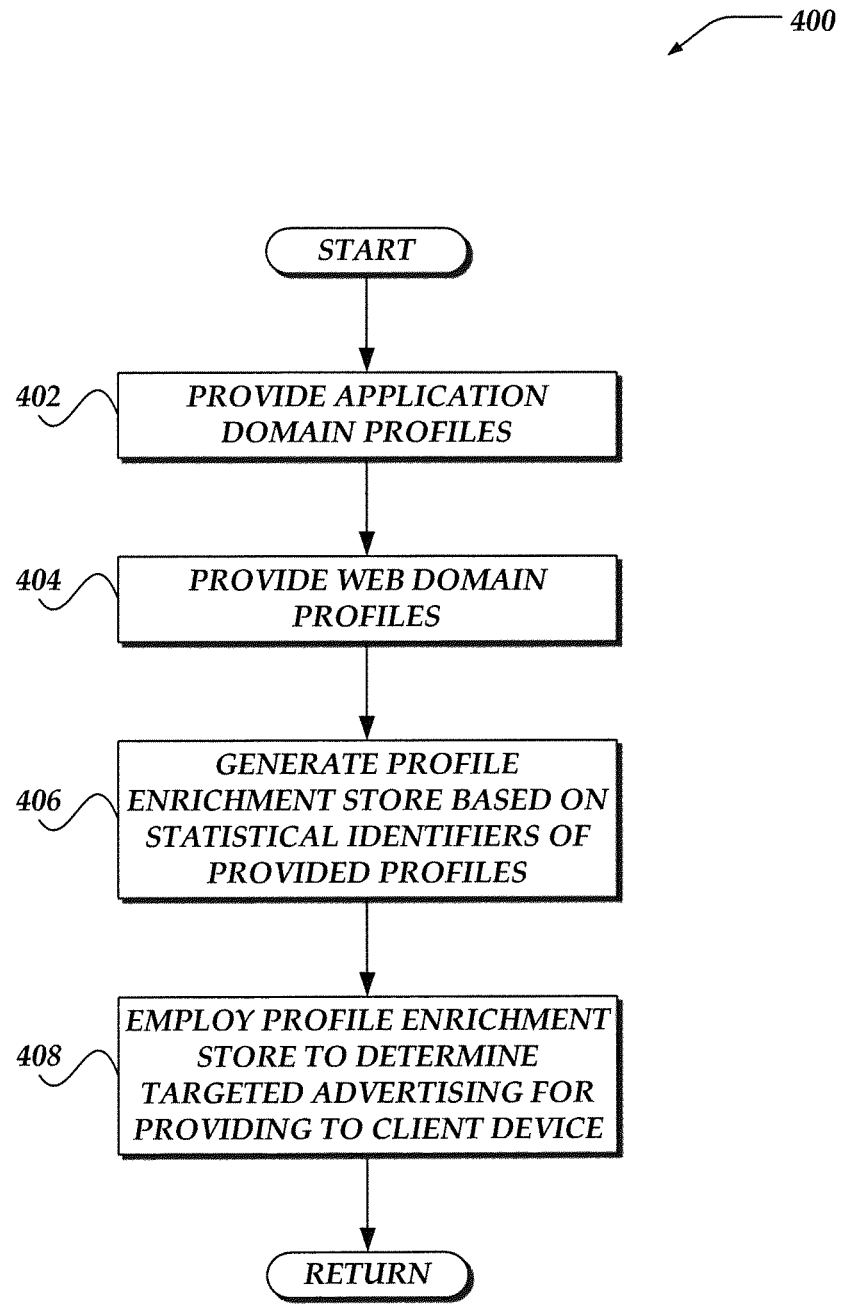
FIG. 4 illustrates a logical flow diagram generally showing one embodiment of an overview process for generating and employing a profile enrichment store to determine targeted advertising for providing to a client device.

FIG. 4 illustrates a logical flow diagram generally showing one embodiment of an overview process for generating and employing a profile enrichment store to determine targeted advertising for providing to a client device.

Process 400 begins, after a start block, at block 402, where a plurality of application domain profiles may be provided. In some embodiments, the application domain profiles may be determined and/or generated based on information monitored by a cross-domain multi-profile tracking approach (CDMPTA). In other embodiments, the application domain profiles may be provided by a third party, such as a website or other data collection service. In at least one of various embodiments, the plurality of application domain profiles may be from or for a plurality of different users or client devices.

Each application domain profile may include a plurality of information. In some embodiments, a statistical identifier may be determined for or included in each application domain profile. In other embodiments, each application domain profile may include user data, one or more associated categories, or the like. Other information, such as, timestamps, opt-out status indicators/flags, UUIDs, or the like, may also be included in each application domain profile. In various embodiments, the statistical identifier may be separate and/or distinct from the UUID. In some embodiments, the UUID may be utilized to identify each different application domain profile.

In some embodiments, an application profile store may be generated from the plurality of application domain profiles. Since the plurality of application domain profiles may be from or for a plurality of different users or client devices, the application profile store may maintain a plurality of entries from a plurality of users/client devices, where each entry corresponds to a different application domain profile. In some embodiments, UUIDs may be utilized to identify each different entry in the application profile store that corresponds to an application domain profile.

In some embodiments, application domain profiles may expire based on a timestamp (e.g., profiles that have been created or not accessed for a given threshold period of time). In other embodiments, application domain profiles may be purged from the application profile store based on the timestamp if a total number of application domain profiles in the application profile store reaches a predetermined number.

Figure 5:
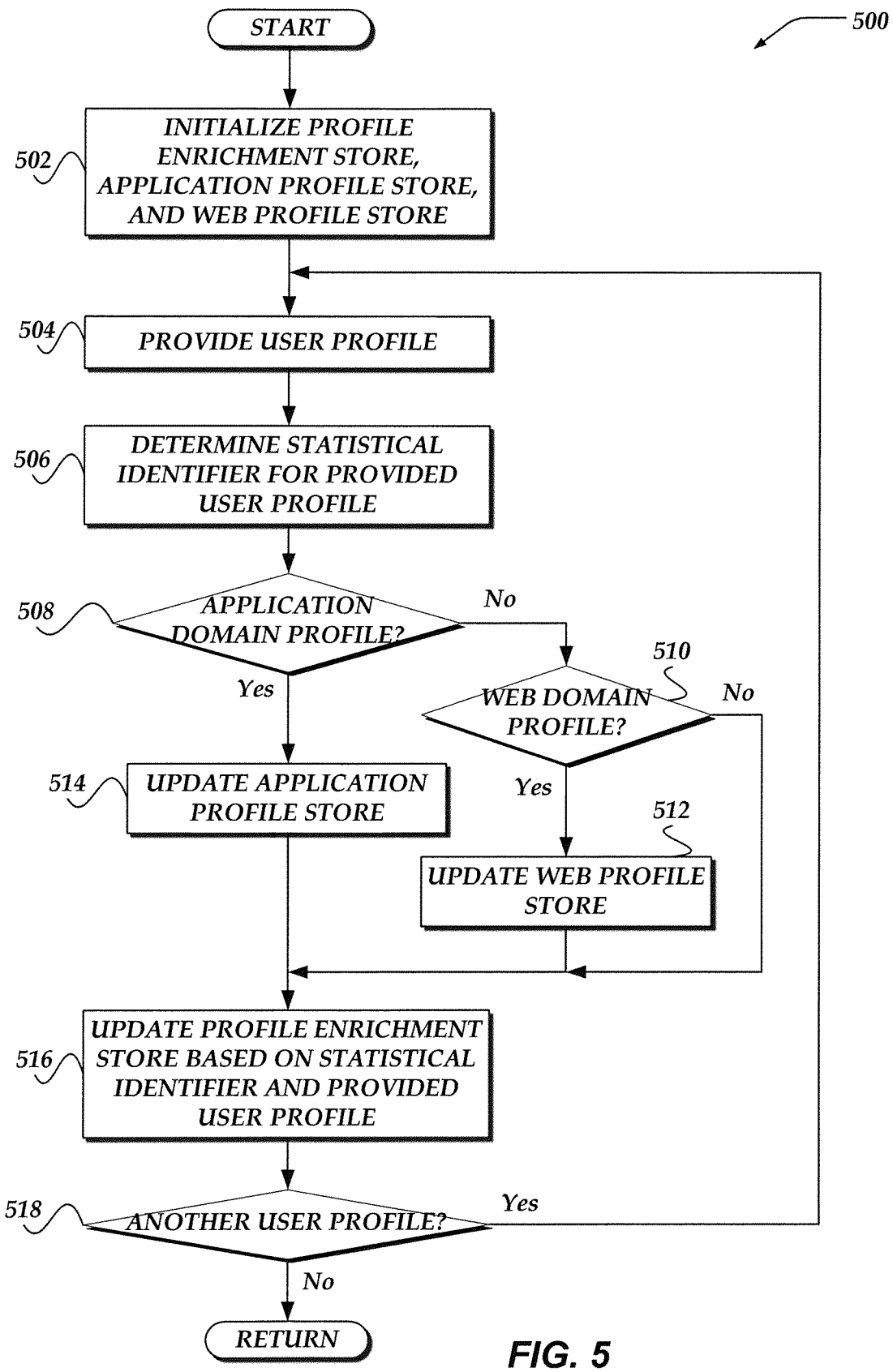
FIG. 5 illustrates a logical flow diagram generally showing one embodiment of a process for updating a profile enrichment store.
Figure 9:
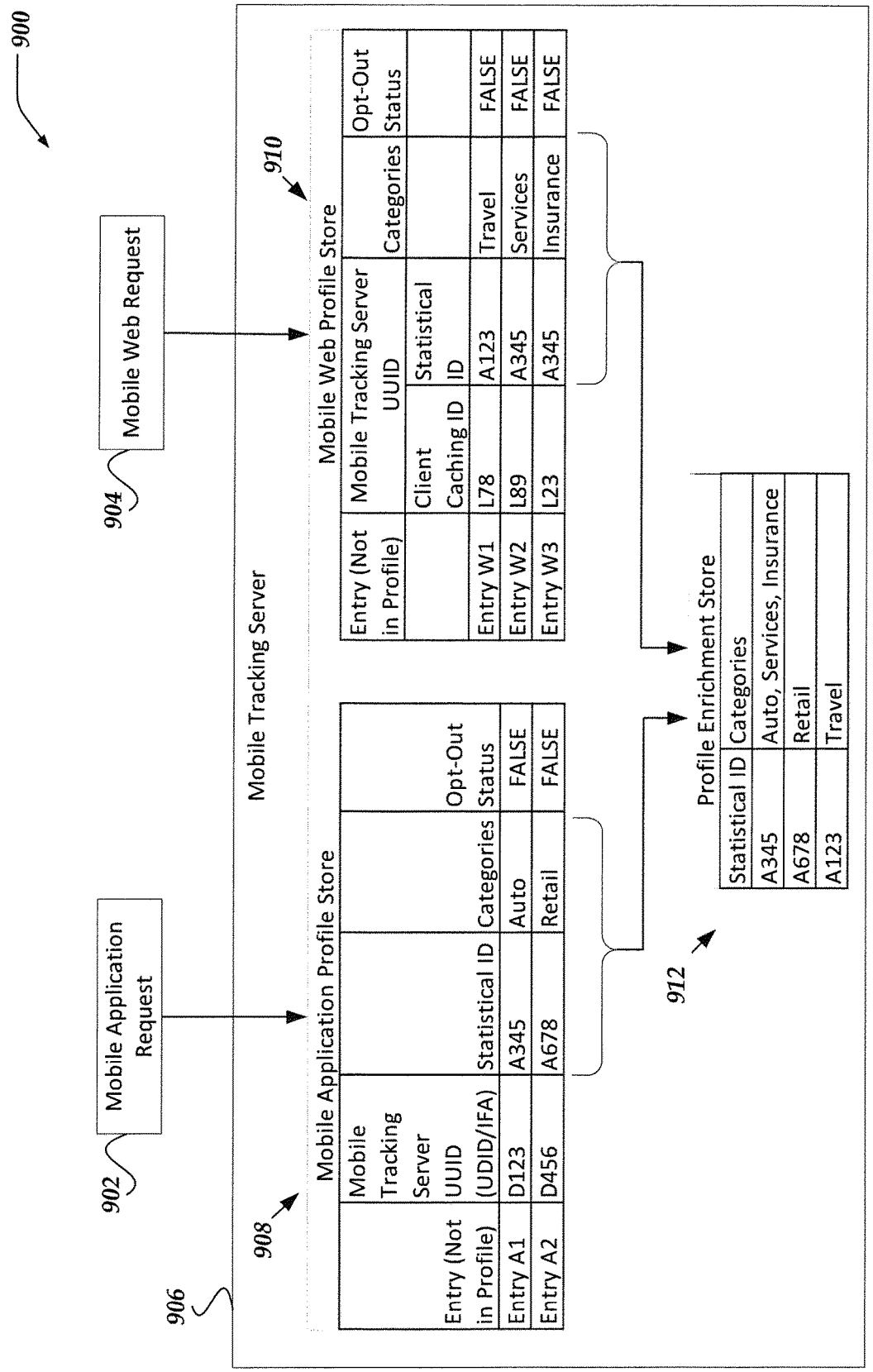
FIGS. 9 and 10 illustrate non-exhaustive examples of use case embodiments of a mobile tracking server storing multiple profiles.

In at least one of various embodiments, process 500 or portions of process 500 of FIG. 5 may be employed to generate and/or update an application profile store. Briefly, however, a plurality of application domain profiles may be received from a plurality of client devices. Each of the plurality of application domain profiles may be maintained and/or stored in the application profile store. FIG. 9 includes an illustration of one non-exhaustive, non-limiting example of an application profile store. In some embodiments, each separate application domain profile may be identified in the application profile store by a corresponding UUID. In at least one embodiment, this UUID may be a unique or semi-unique value (e.g., a UDID and/or IFA).

Process 400 proceeds to block 404, where a plurality of web domain profiles may be provided. In some embodiments, the web domain profiles may be determined and/or generated based on information monitored by a multi-profile tracking server device. In other embodiments, the web domain profiles may be provided by a third party, such as a website or other data collection service. In at least one of various embodiments, the plurality of web domain profiles may be from or for a plurality of different users or client devices.

Each web domain profile may include a plurality of information. In some embodiments, a statistical identifier may be determined for or included in each web domain profile. In other embodiments, each web domain profile may include user data, one or more associated categories, or the like. Other information, such as, timestamps, opt-out status indicators/flags, UUIDs, client caching identifiers, or the like, may also be included in each web domain profile. In some embodiments, each separate web domain profile may be identified in a web profile store by a UUID. In at least one embodiment, this UUID may be a semi-unique value based on a combination of a statistical identifier and a client caching identifier. In at least one of various embodiments, the CDMPTA may generate and/or provide the client caching identifier to a client device associated with a web domain profile. The client caching identifier may be stored in a cache of the client device. In some embodiments, the client caching identifier value may be associated with a timestamp that may be store one the server side (e.g., in the web profile store)

In some embodiments, a web profile store may be generated from the plurality of web domain profiles. Since the plurality of web domain profiles may be from or for a plurality of different users or client devices, the web profile store may maintain a plurality of entries from a plurality of users/client devices, where each entry corresponds to a different web domain profile. In some embodiments, web domain profiles may expire based on a timestamp (e.g., profiles that have been created or not accessed for a given threshold period of time). In other embodiments, web domain profiles may be purged from the web profile store based on the timestamp if a total number of web domain profiles in the web profile store reaches a predetermined number.

In at least one of various embodiments, process 500 or portions of process 500 of FIG. 5 may be employed to generate and/or update a web profile store. Briefly, however, a plurality of web domain profiles may be received from a plurality of client devices. Each of the plurality of web domain profiles may be maintained and/or stored in the web profile store. FIG. 9 includes an illustration of one non-exhaustive, non-limiting example of a web profile store.

In any event, process 400 continues at block 406, where a profile enrichment store may be generated. In at least one of various embodiments, process 500 or portions of process 500 of FIG. 5 may be employed to generate and/or update the profile enrichment store. In some embodiments, the profile enrichment store may be generated based on the statistical identifiers of at least a portion of the plurality of application domain profiles and the plurality of web domain profiles. The profile enrichment store may store each different statistical identifier included in an application domain profile and/or web domain profile.

Since the statistical identifier may be non-unique for each user profile, there may be one or more user profile that share or have a same statistical identifier. So, in various embodiments, there may be one or more statistical identifiers included in both an application domain profile and a web domain profile. The profile enrichment store may include a separate entry or line item for each different statistical identifier (each statistical identifier stored in the profile enrichment store may be unique compared to other statistical identifiers stored in the profile enrichment store), such that the profile enrichment store maintains statistical identifiers as if they are unique to a specific user profile. Accordingly, the statistical identifiers in the profile enrichment store may bridge or stitch application domain profiles with web domain profiles.

In other embodiments, the profile enrichment store may be generated from the application profile store and the web profile store based on the statistical identifiers of the user profiles. The profile enrichment store may store each different statistical identifier included in a user profile from the application profile store and/or the web profile store.

The profile enrichment store may also maintain and/or store one or more categories (or other user data or tagging information) associated with each different statistical identifier. The categories for a given statistical identifier may be obtained from either or both application domain profiles and/or web domain profiles that include the given statistical identifier. In some embodiments, the application profile store and the web profile store may be searched for each different statistical identifier and all categories associated with a corresponding statistical identifier.

For example, if an application domain profile includes the statistical identifier "A345" and the category "retail", then the profile enrichment store may be generated and/or updated to include the statistical identifier "A345" and the associated category "retail". Continuing this example, if a web domain profile also includes the statistical identifier "A345" and the category "services", then the profile enrichment store may be updated such that the statistical identifier "A345" is associated with the category "retail" and also the category "services". It should be understood that the values for the statistical identifier described herein are for illustration purposes and other statistical identifier values may be employed. Similarly, it should be understood that the categories utilized herein are for illustration purposes and other categories may be employed.

In some of the various embodiments, the profile enrichment store may be directly updated based on the provided user profile—independent of any updates to the application profile store or the web profile store. In other embodiments, updates to the application profile store or the web profile store may filter into the profile enrichment store.

In any event, process 400 proceeds next to block 408, where the profile enrichment store may be employed to determine one or more targeted advertisements to provide to a client device, which is described in more detail below in conjunction with FIG. 6. Briefly, however, a request may be received from a client device. The request may include a statistical identifier, which may be utilized to determine one or more associated categories in the profile enrichment store. A targeted advertisement may be determined and/or selected based on the one or more determined categories, and may be provided to the client device.

By employing embodiments described herein, targeted advertisements may be provided to client devices and/or users on one domain based on information (e.g., user data or categories) obtain from a different domain, which may be referred to as retargeting between domains. In some embodiments, a client device may be qualified on the application domain (e.g., an entry in profile enrichment store may be created based on an application domain profile for the client device), but a targeted advertisement may be provided to the client device based on a request in the web domain. Similarly, in other embodiments, a client device may be qualified on the web domain (e.g., an entry in profile enrichment store may be created based on a web domain profile for the client device), but a targeted advertisement may be provided to the client device based on a request in the application domain.

In some other embodiments, client devices/users may be tracked based on actions that transfer between domains, which may be referred to as conversion tracking. For example, in some embodiments, a user may click on an advertisement in an application, which may open a web browser and direct the user to the advertiser's website. In at least one such embodiment, the user clicking on the advertisement in the application may provide an application domain request, which may populate an application domain profile. Additionally, the accessing of the advertiser's website may provide a web domain request, which may populate a web domain profile. This conversion between domains may be tracked through the profile enrichment store by employing a statistical identifier for the user (or client device associated with the user). In another example embodiment, a user may click on a link in a web browser to download an application. By employing embodiments described herein, the profile enrichment store may be utilized as a bridge between domains to enable advertisement retargeting and/or conversion tracking.

After block 408, process 400 may return to a calling process to perform other actions. In some embodiments, process 400 may loop (not shown) to block 402 to update the application profile store, web profile store, and/or profile enrichment store. In at least one embodiment, the application profile store, web profile store, and/or profile enrichment store may continually be updated based on newly provided and/or received user profiles. In other embodiments, process 400 may loop (not shown) to block 408 to continually employ the profile enrichment store to determine and provide targeted advertisements.

FIG. 5 illustrates a logical flow diagram generally showing one embodiment of a process for updating a profile enrichment store. Process 500 begins, after a start block, at block 502, where a profile enrichment store, application profile store, and web profile store may be initialized. In various embodiments, this initialization may include instantiating and/or allocating memory/storage for each of the profile stores. In some embodiments, the initialization may enable an administrator to determine what user data or categories to store, a data structure to be employed, or the like.

Process 500 may proceed to block 504, where a user profile may be provided. In some embodiments, the user profile may be determined and/or monitored by a CDMPTA. In some embodiments, the user profile may be provided by a third party, such as a website, host server, network service provider, social network host/manager, or the like, or any combination thereof. In other embodiments, the user profile may be determined based on information communicated between a client device (e.g., client device 200 of FIG. 2) and a server device (e.g., network device 300 of FIG. 3).

In at least one of various embodiments, the user profile may be generated based on information obtained from the client device, information obtained from a user's actions associated with a client device, or the like, or any combination thereof. For example, the CDMPTA may obtain a UUID from a client device, determine a statistical identifier for the client device (e.g., at block 506), determine other user data based on websites visited or other user provided information, or the like. In any event, in various embodiments, block 504 may employ embodiments of blocks 402 and/or 404 of FIG. 4 to provide or receive a user profile.

Process 500 may proceed to block 506, where a statistical identifier may be determined for the provided user profile. In some embodiments, one or more client device parameters may be employed to determine the statistical identifier. Examples, of such parameters include, but are not limited to, a web browser model and/or version, IP address, HTTP request header information, or the like, or any combination thereof. In at least one of various embodiments, the statistical identifier may include or be based on device fingerprinting technologies. In some embodiments, if a statistical identifier cannot be determined for the provided profile (e.g., a lack of device parameter information), then the provided profile may be discarded, and process 500 may proceed (not shown) from block 506 to decision block 518.

Process 500 may continue at decision block 508, where a determination may be made whether the provided profile is an application domain profile. In some embodiments, the user profile may include a flag or other indicator that the profile is an application domain profile. In other embodiments, this determination may be based on a request associated with providing the user profile. In at least one such embodiment, the request may be an application initiated request, which may indicate that a profile generated/determined based on the request is an application domain profile. In other embodiments, this determination may be made based on information included in the provided user profile. For example, the user profile may include a UUID that is accessible to an application (e.g., a UDID or IFA), but not to a web browser—so, the user profile may be an application domain profile. However, embodiments are not so limited and other mechanisms may be employed to determine if the provided user profile is an application domain profile. If the provided profile is an application domain profile, then process 500 may flow to flow 514; otherwise, process 500 may flow to decision block 510.

At decision block 510, a determination may be made whether the provided profile is a web domain profile. In some embodiments, the user profile may include a flag or other indicator that the profile is a web domain profile. In other embodiments, this determination may be based on a request associated with providing the user profile. In at least one such embodiment, the request may be initiated by a web browser, which may indicate that a profile generated/determined based on the request is a web domain profile. In other embodiments, this determination may be made based on information included in the provided user profile. For example, the user profile may include an identifier that is accessible to the web browser, but not to other applications—so, the user profile may be a web domain profile. However, embodiments are not so limited and other mechanisms may be employed to determine if the provided user profile is a web domain profile. If the provided profile is a web domain profile, then process 500 may flow to flow 512; otherwise, process 500 may flow to decision block 516. In some embodiments, if the provided profile is not a web domain profile or an application domain profile, then the provided profile may be ignored and/or discarded and process 500 may proceed (not shown) from decision block 510 to decision block 518.

At block 512, the web profile store may be updated based on the provided user profile (i.e., the provided web domain profile). In some embodiments, the provided user profile may be new and not previously stored in the web profile store. In at least one such embodiment, a new entry may be added to the web profile store to include the provided user profile. As described herein, a UUID for a web domain profile may be based on a client caching identifier and a statistical identifier. If the provided user profile is a new profile (i.e., it does not include a client caching identifier or a client caching identifier cannot be obtained from a client device associated with the provided user profile), then the provided user profile may be added to the web profile store. In at least one such embodiment, a client caching identifier may be generated and provided to the client device associated with the provided user profile (and included in the new web domain profile in the web profile store). In at least one embodiment, the client caching identifier may be combined with statistical identifier for the client device to create a UUID for the web domain profile. In some embodiments, this combination may be a hash of the identifiers.

In other embodiments, the provided user profile may not be a new profile and may have been previously stored in the web profile store. In some embodiments, if the provided user profile includes client caching identifier, then the provided user profile may be a previously stored profile. In at least one of various embodiments, the CDMPTA may communication with the client device to obtain the client caching identifier. In various embodiments, the client caching identifier may be utilized, along with the determined statistical identifier determine a UUID of the provided user profile. The entry in the web profile store that corresponds to this UUID may be updated based on the provided user profile.

In some embodiments, updating an entry in the web profile store may include modifying and/or adding categories to the corresponding web domain profile in the web profile store. In at least one of various embodiments, these categories may be determined based on the provided user profile, actions performed by a user or client device associated with the provided user profile, an associated request, or the like. In other embodiments, the updating of the web profile store may include updating or modifying a time stamp of the corresponding web domain profile.

In yet other embodiments, an opt-out status indication of the corresponding profile may be modified, which is described in more detail below in conjunction with FIG. 7. After block 510, process 500 may flow to block 514.

If, at decision block 508, the provided user profile is an application domain profile, then process 500 may flow from decision block 508 to block 514. At block 514, the application profile store may be updated based on the provided user profile (i.e., the provided application domain profile).

In some embodiments, the provided user profile may be new and not previously stored in the application profile store. In at least one such embodiment, a new entry may be added to the application profile store to include the provided user profile. As described herein, a UUID for an application domain profile may be based on a UDID, IFA, or the like.

In other embodiments, the provided user profile may not be a new profile and may have been previously stored in the application profile store. In some embodiments, if the provided user profile may include a UUID that was previously stored in the application profile store, then the provided user profile may be a previously stored profile. The entry in the application profile store that corresponds to this UUID may be updated based on the provided user profile.

In some embodiments, updating an entry in the application profile store may include modifying and/or adding categories to the corresponding application domain profile in the application profile store. In at least one of various embodiments, these categories may be determined based on the provided user profile, actions performed by a user or client device associated with the provided user profile, an associated request, or the like. In other embodiments, the updating of the application profile store may include updating or modifying a time stamp of the corresponding web domain profile.

In yet other embodiments, an opt-out status indication of the corresponding profile may be modified, which is described in more detail below in conjunction with FIG. 7. In any event, block 514 may employ some embodiments of block 512 to update a profile store.

Process 500 may continue next at block 516, where the profile enrichment store may be updated based on the determined statistical identifier and the provided user profile. If the determined statistical identifier (at block 506) is new and not previously recorded in the profile enrichment store, then the determined statistical identifier and associated categories (e.g., from the provided user profile) may be added to the profile enrichment store. If the determined statistical identifier (at block 506) is already included in the profile enrichment store, then the corresponding statistical identifier in the profile enrichment store may be updated to include the categories associated with the provided user profile. In at least one of various embodiments, the categories associated with a particular statistical identifier in the application profile store and the web profile store may be merged into the profile enrichment store.

Process 500 may proceed next to decision block 518, where a determination may be made whether another user profile is provided. In some embodiments, this determination may be based on a plurality of provided user profiles, such that each provided user profile is processed by process 500. In other embodiments, another user profile may be provided if a client device provides a request, from which a user profile can be generated. If another user profile is provided, then process 518 may loop to block 504; otherwise, process 500 may return to a calling process to perform other actions.

Figure 6:
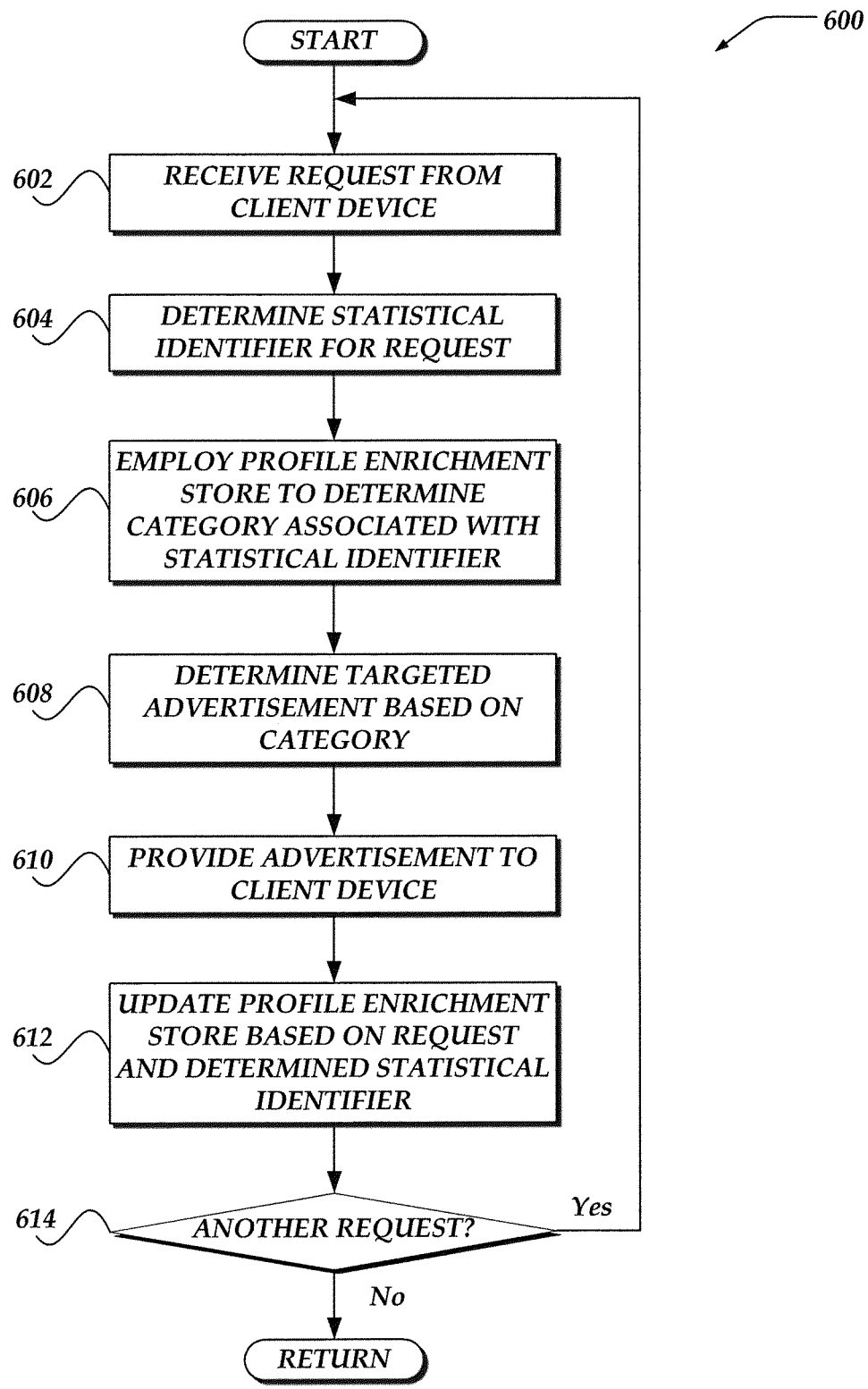
FIG. 6 illustrates a logical flow diagram generally showing one embodiment of a process for determining and providing a targeted advertisement based on a request.

FIG. 6 illustrates a logical flow diagram generally showing one embodiment of a process for determining and providing a targeted advertisement based on a request. Process 600 begins, after a start block, at block 602, where a request for content may be received from a client device. In some embodiments the content request may be a request for a website or webpage, an in-application purchase, an advertisement click through (from a webpage or an application), downloading an application, or the like.

Process 600 may proceed to block 604, where a statistical identifier may be determined for the content request. In at least one of various embodiments, block 604 may employ embodiments of block 506 of FIG. 5 to determine the statistical identifier.

Process 600 may continue at block 606, where the profile enrichment store may be employed to determine a category that is associated with the determined statistical identifier. In some embodiments, the profile enrichment store may maintain a list of categories associated with each statistical identifier in the profile enrichment store. In at least one of the various embodiments, the profile enrichment store may be searched for the determined statistical identifier. If the statistical identifier is found in the profile enrichment store, then the categories associated with the statistical identifier may be identified as the determined categories.

In some other embodiments, one or more categories may be determined from the application profile store or the web profile store. In at least one embodiment, the request may be from the application domain. If the request is from the application domain, then an application domain profile may be associated with the request. To determine if the request is associated with an application domain profile, then an application domain UUID may be determined for the request. As described herein, this UUID may be a unique device identifier (e.g., UDID) or an advertising identifier provided to the device (e.g., IFA). The application profile store may be searched for this UUID. If the UUID is found in the application profile store, then the categories associated with the UUID may be identified as the determined category. If the UUID is not found in the application profile store, then the profile enrichment store may be employed to determine the category, as described above.

In at least one other embodiment, the request may be from the web domain. If the request is from the web domain, then a web domain profile may be associated with the request. To determine if the request is associated with a web domain profile, then a web domain UUID may be determined for the request. As described herein, this UUID may be a combination of the statistical identifier and a client caching identifier. The web profile store may be searched for this UUID. If the UUID is found in the web profile store, then the categories associated with the UUID may be identified as the determined category. If the UUID is not found in the web profile store, then the profile enrichment store may be employed to determine the category, as described above.

In any event, process 600 may proceed next to block 608, where a targeted advertisement may be determined based on the determined category. In some embodiments, an advertisement may be selected from a plurality of advertisements as the targeted advertisement. In at least one of the various embodiments, each of the plurality of advertisements may include or be tagged with one or more categories. The determined categories (from block 606) may be compared with the categories of each of the plurality of advertisements. In some embodiments, the plurality of advertisements may be weighted based on how well the determine categories match the categories of the plurality of advertisements. For example, if the determined categories are insurance and auto, then advertisements with both categories may be weighted higher than advertisements with one of these categories but not the other. In various embodiments, one or more of the plurality of advertisements may be determined as the targeted advertisement based on the weights and/or the comparison of categories.

Process 600 may continue next at block 610, where the targeted advertisement may be provided to the client device that corresponds to the content request. In some embodiments, the targeted advertisement may be provided in a display of a web page (e.g., if the request is from the web domain). In other embodiments, the targeted advertisement may be displayed to a user in an application banner (e.g., if the request is from the application domain). However, embodiments are not so limited and other mechanisms may be employed to provide the targeted advertisement to the client device.

Process 600 may proceed to block 612, where the enrichment store may be updated based on the request and the determined statistical identifier. In at least one of various embodiments, block 612 may employ embodiments of block 516 of FIG. 5 to update the enrichment store.

Process 600 may continue at decision block 614, where a determination may be made whether another request is received. In some embodiments, another request may be received from a same or different client device. If another request is received, process 600 may loop to block 602; otherwise, process 600 may return to a calling process to perform other actions.

Figure 7:
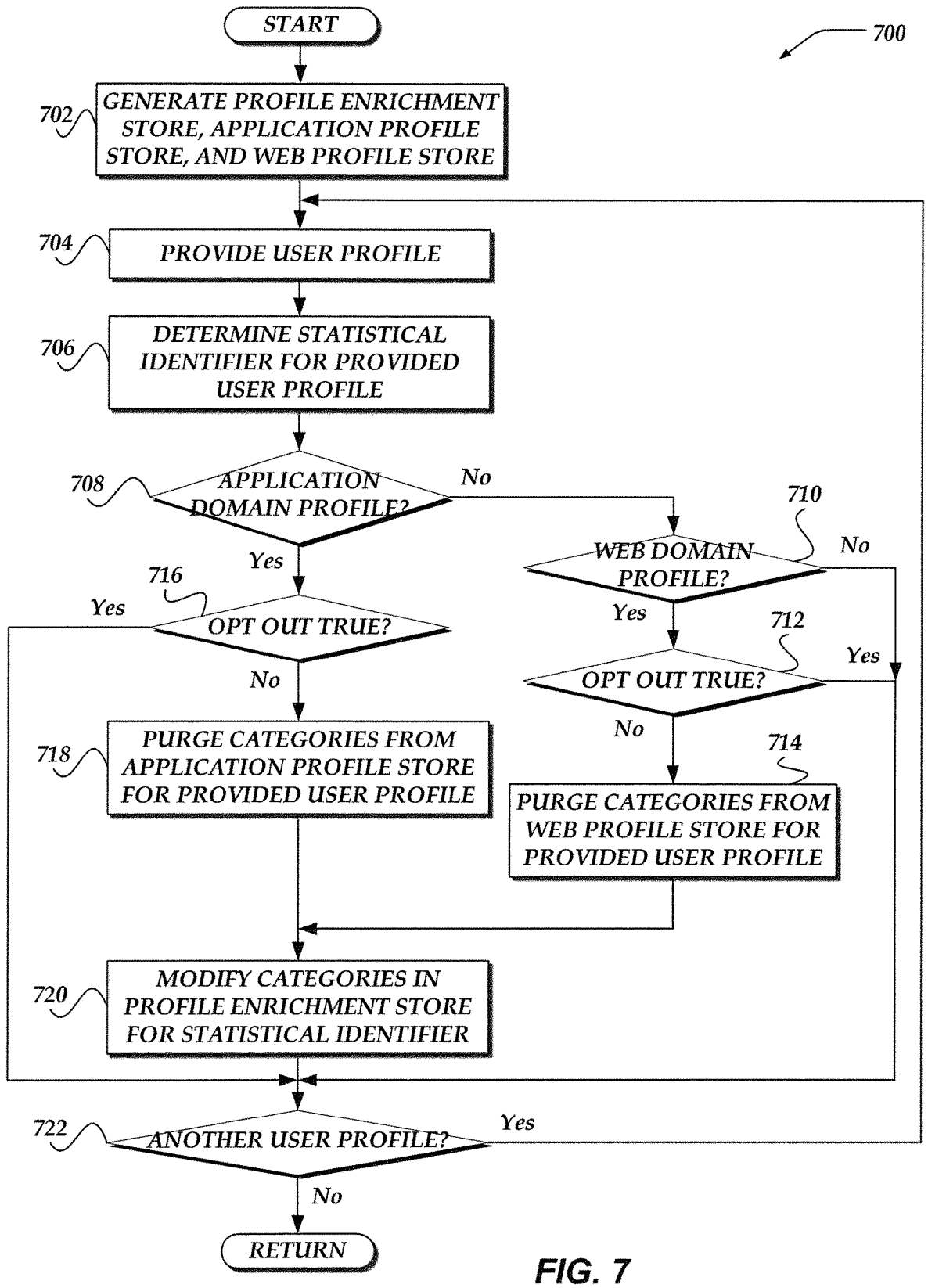
FIG. 7 illustrates a logical flow diagram generally showing one embodiment of a process for updating a profile enrichment store for users who opt out of profile tracking.

FIG. 7 illustrates a logical flow diagram generally showing one embodiment of a process for updating a profile enrichment store for users who opt out of profile tracking. Process 700 begins, after a start block, at block 702, where a profile enrichment store, application profile store, and web profile store may be generated. In at least one of various embodiments, block 702 may employ embodiments of process 500 of FIG. 5 to generate the profile stores.

Process 700 may proceed to block 704, where a user profile may be provided. In at least one of various embodiments, block 704 may employ embodiments of block 504 of FIG. 5.

Process 700 may continue at block 706, where a statistical identifier may be determined for the provided user profile. In at least one of various embodiments, block 706 may employ embodiments of block 506 of FIG. 5 to determine a statistical identifier for a user profile.

Process 700 may continue at decision block 708, where a determination may be made whether the provided user profile is an application domain profile. In at least one of various embodiments, decision block 708 may employ embodiments of decision block 508 of FIG. 5 to determine if the provided user profile is an application domain profile. If the provided user profile is an application domain profile, then process 700 may flow to decision block 716; otherwise, process 700 may flow to decision block 710.

At decision block 710, a determination may be made whether the provided user profile is a web domain profile. In at least one of various embodiments, decision block 710 may employ embodiments of decision block 510 of FIG. 5 to determine if the provided user profile is a web domain profile. If the provided user profile is a web domain profile, then process 700 may flow to decision block 712; otherwise, process 700 may flow to decision block 722.

At decision block 712, a determination may be made whether the provided user profile includes an affirmative opt out status indication. In at least one embodiment, this determination may be made based on a corresponding profile entry in the web profile store. In some embodiments, each entry of the web profile store may include an opt-out status indicator or flag. In at least one of various embodiments, the web profile store may be searched for a web domain profile that corresponds to the provided user profile (e.g., by a web domain UUID). In other embodiments, the provided user profile may itself include an opt-out status indicator. If the opt out is true (i.e., an affirmative opt-out status indication), then process 700 may flow to decision block 722; otherwise, process 700 may flow to block 714.

At block 714, one or more categories for the provided user profile may be removed from the web profile store. In some embodiments, the categories associated with a web domain profile that corresponds to the provided user profile may be purged from the web profile store. After block 714, process 700 may flow to block 720.

If at decision block 708, the user profile is an application domain profile, then process 700 may flow from decision block 708 to decision block 716. At decision block 716, a determination may be made whether the provided user profile includes an affirmative opt out status indication. In at least one embodiment, this determination may be made based on a corresponding profile entry in the application profile store. In some embodiments, each entry of the application profile store may include an opt-out status indicator or flag. In at least one of various embodiments, the application profile store may be searched for an application domain profile that corresponds to the provided user profile (e.g., by an application domain UUID). In other embodiments, the provided user profile may itself include an opt-out status indicator. If the opt out is true (i.e., an affirmative opt-out status indication), then process 700 may flow to decision block 722; otherwise, process 700 may flow to block 718.

At block 718, one or more categories for the provided user profile may be removed from the application profile store. In some embodiments, the categories associated with an application domain profile that corresponds to the provided user profile may be purged from the application profile store.

Figure 10:
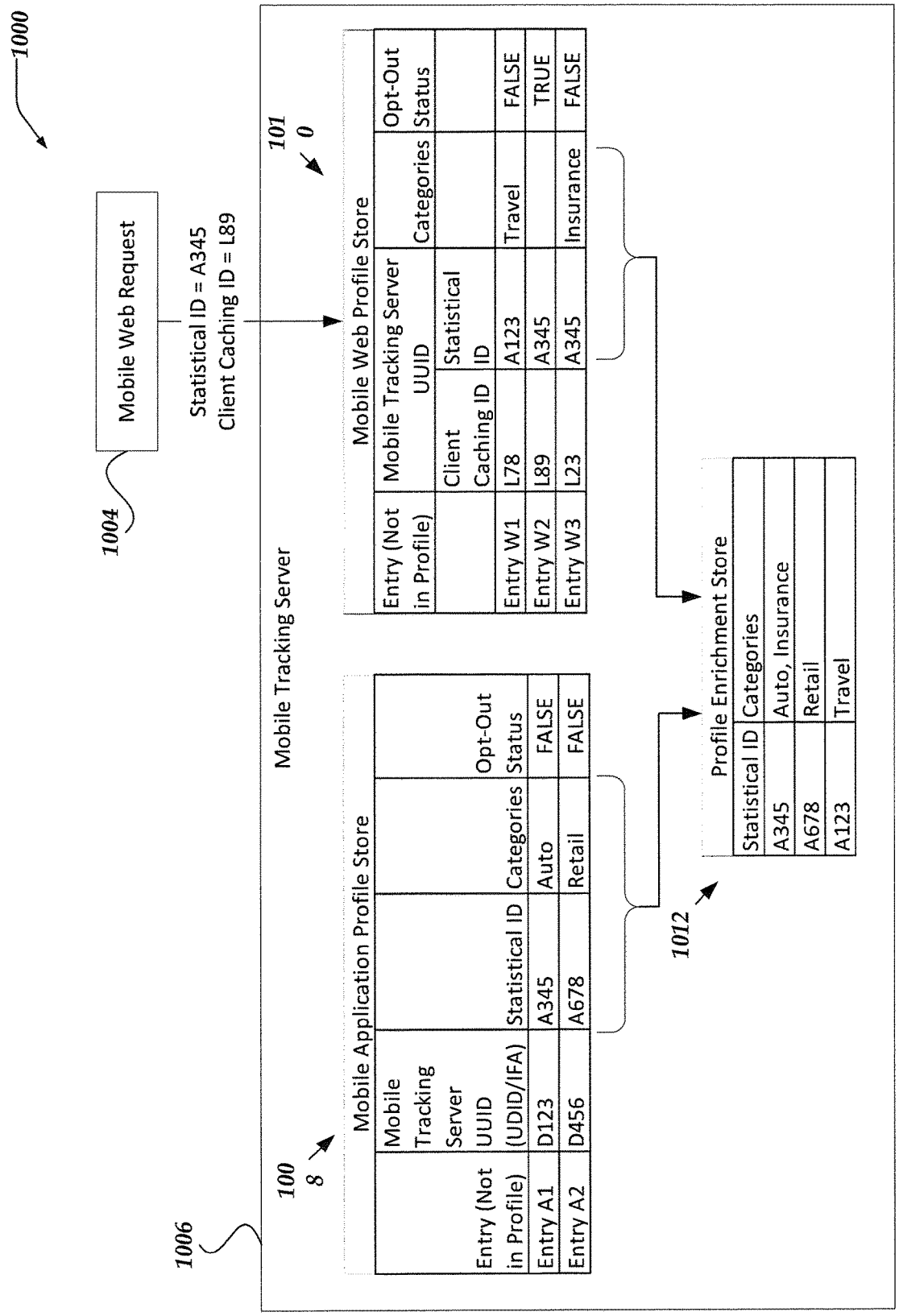

Process 700 may continue at block 720, where one or more categories for the statistical identifier of the provided user profile may be removed from the profile enrichment store. If the provided user profile (i.e., web domain profile or application domain profile) includes an affirmative opt-out status indication, updating at least the profile enrichment store to remove at least one category that is associated with the statistical identifier for the provided user profile (i.e., web domain profile or application domain profile). In other embodiments, the previous categories associated with the provided user profile may be removed (i.e., a portion of the categories associated with the statistical identifier). For example, assume a statistical identifier of the provided user profile is associated with the categories "auto, services, and insurance" in the profile enrichment store. If the provided user profile was previously associated with the category "services", then the category "services" may be removed from the profile enrichment store for the statistical identifier of the provided user profile. FIG. 10 illustrates one such non-limiting, non-exhaustive example.

In some other embodiments, the application profile store and the web profile store may be search for entries that include the determined statistical identifier and a negative opt-out status indicator to re-establish categories associated with the statistical identifier.

In yet other embodiments, all categories associated with the statistical identifier may be removed from the corresponding entry in the profile enrichment store. In at least one of various embodiments, this entry in the profile enrichment store may be re-established or re-populated with categories as other user profiles are provided or additional requests are provided, such as by employing embodiments of process 500 of FIG. 5.

In any event, process 700 may proceed to decision block 722, where a determination may be made whether another user profile is provided. In at least one of various embodiments, decision block 722 may employ embodiments of decision block 518 of FIG. 5. If another user profile is provided, then process 722 may loop to block 704; otherwise, process 700 may return to a calling process to perform other actions.

Figure 8:
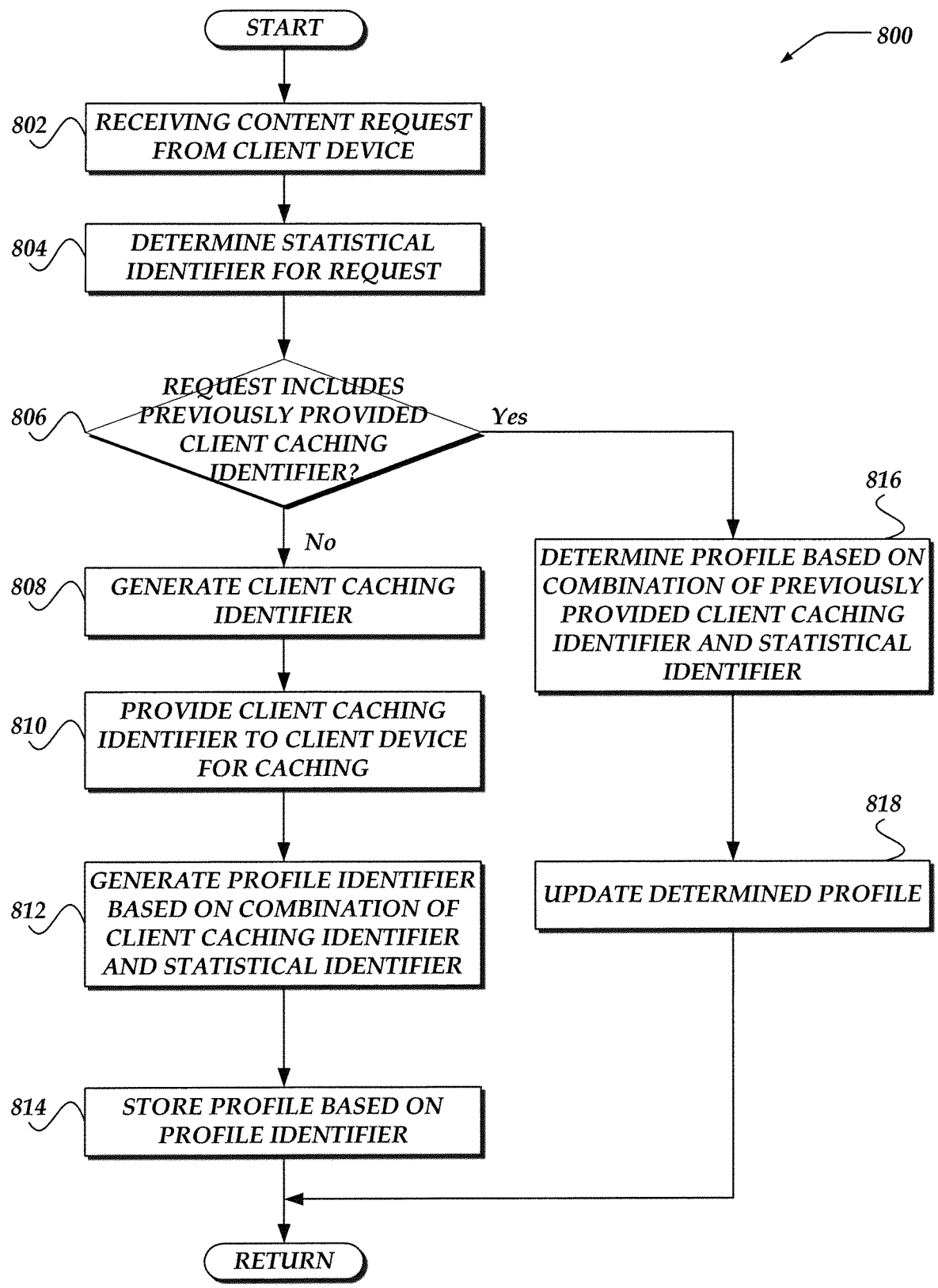
FIG. 8 illustrates a logical flow diagram generally showing one embodiment of a process for generating and providing a client caching identifier.

FIG. 8 illustrates a logical flow diagram generally showing one embodiment of a process for generating and providing a client caching identifier. Process 800 begins, after a start block, at block 802, where a content request may be received from a client device. In at least one of various embodiments, block 802 may employ embodiments of block 602 of FIG. 6.

Process 800 may proceed to block 804, where a statistical identifier for the request (or the client device sending the content request) may be determined. In at least one of various embodiments, block 804 may employ embodiments of block 604 to determine the statistical identifier for the request.

Process 800 may continue at decision block 806, where a determination may be made whether the content request includes a previously provided client caching identifier. The previously provided client caching identifier may be a client caching identifier that was sent to and stored in a cache of the client device during a previous content request from the client device. In at least one of various embodiments, the client caching identifier may be sent to the client device if the previous request was from a web domain. However, embodiments are not so limited, and the client caching identifier may be sent to the client device if the previous request was from a different domain, such as, but not limited to an application domain.

In some embodiments, the content request may itself include the previously provided client caching identifier. In at least one such embodiment, the content request may include the previously provided client caching identifier in a packet header, a separate packet sent with the request, or the like.

In other embodiments, the content request may initiate a communication or handshake between a network device (e.g., a CDMPTSD 112 of FIG. 1) and the requesting client device to determine/obtain a previously stored client caching identifier. In at least one such embodiment, in response to the content request, the network device may send a follow-up request to the client device for a previously provided (e.g., previously cached) client caching identifier. If the client device has cached a previously provided client caching identifier, then the client device may respond with the previously provided client caching identifier. Otherwise, the client device may respond with a null or blank client caching identifier. If the request includes a previously provided client caching identifier, then process 800 may flow to block 816; otherwise, process 800 may flow to block 808

At block 816, a profile associated with the client device may be determined based on a combination of the previously provided client caching identifier and the determined statistical identifier. In at least one of various embodiments, the profile may be determined based on a profile identifier or UUID that may be generated from a combination of the previously provided client caching identifier and the statistical identifier. For example, in at least one embodiment the UUID may be a hash of the client caching identifier and the statistical identifier. However, embodiments are not so limited and other mechanisms may be utilized to combine the previously provided client caching identifier and the statistical identifier to determine a UUID of a corresponding profile.

Process 800 may proceed from block 816 to block 818, where the determined profile may be updated. A profile store, such as, but not limited to a web domain profile store, may maintain a plurality of profiles (such as described above). In at least one of various embodiments, the profile in the profile store that corresponds to the determined profile identifier may be updated.

In some embodiments, the profile may be updated based on information associated with the request. For example, if the request is for a particular website, then the profile may be updated to include one or more categories that are associated with the website. However, embodiments are not so limited and other mechanisms and/or updates to the profile may be employed. After block 818, processing may return to a calling process to perform other actions.

If, at decision block 806, the request fails to include (or lacks) a previously provided client caching identifier, then process 800 may flow from decision block 806 to block 808. At block 808, a client caching identifier may be generated. In some embodiments, the client caching identifier may be a randomly generated number. In other embodiments, the client caching identifier may be a next number in a sequence of numbers that was not previously provided to a client device (e.g., a next chronological number). In at least one of various embodiments, the client caching identifier may be based on and/or associated with a timestamp of when the request was received.

In at least another of the various embodiments, the client caching identifier may be a fixed length and/or fixed number of bits or bytes. For example, in at least one embodiment, the length of the client caching identifier may be determined (e.g., by engineering judgment) such that the combination of the client caching identifier and the statistical identifier generates a profile identifier that is semi-unique for predetermined granularity. In some embodiments, this predetermined granularity may enable some level of anonymity, but still be unique enough to be useful for determining categories for targeted advertisements. In one non-limiting, non-exhaustive example, the length of the client caching identifier may be set such that the profile identifier can be associated with no fewer than 1000 client devices. However, embodiments are not so limited and other lengths of client caching identifiers may be determined and/or utilized.

Process 800 may proceed to block 810, where the client caching identifier may be provided to the client device for storing in the cache of the client device. In at least one of various embodiments, the client caching identifier may be stored by the client device independent and separate of browser persistent identification mechanisms (e.g., cookies).

Process 800 may continue at block 812, where a profile identifier may be generated based on a combination of the client caching identifier and the determined statistical identifier. In at least one embodiment, block 812 may employ embodiments of block 816 to generate the profile identifier from the newly generated client caching identifier and the statistical identifier Process 800 may proceed next to block 814, where a profile may be generated and stored for the client device based on the profile identifier. In some embodiments, a targeted advertisement may be provided to the client device based at least on the stored profile. In other embodiments, a targeted advertisement may be selected based on a category associated with the determined statistical identifier, as described herein.

After block 814, processing may return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Use Case Illustrations

FIGS. 9 and 10 illustrate non-exhaustive examples of use case embodiments of a mobile tracking server storing multiple profiles.

Example 900 may include a mobile application request 902, mobile web request 904, and mobile tracking server 906. Mobile tracking server 906 may include mobile application profile store 908, mobile web profile store 910, and profile enrichment store 912. Mobile application profile store 908 may include a plurality of application domain profiles. Each application domain profile may include an entry identifier, a mobile tracking server UUID, a statistical identifier, one or more categories, and an opt-out status or flag. However, each application domain profile may include additional information not shown. Mobile web profile store 910 may include a plurality of web domain profiles. Each web domain profile may include an entry identifier, a mobile tracking server UUID, one or more categories, and an opt-out status or flag. In at least one embodiment, the mobile tracking server UUID for each web domain profile may be based on a client caching identifier and a statistical identifier. However, each web domain profile may include additional information not shown.

The statistical identifiers, and associated categories of each profile, may be utilized to generate profile enrichment store 912. As illustrated, Entry A1 (in mobile application profile store 908) may include the statistical identifier A345 and the category "auto". Entry W2 and Entry W3 (in mobile web application profile 910) may include the categories "services" and "insurance", respectively. By employing embodiments described herein, profile enrichment store 912, may be generated and/or updated to include an entry or line item for statistical identifier A345 and a list of associated categories—"auto", "services", and "insurance". It should be recognized that the values for mobile tracking server UUIDs, statistical identifiers, categories, and opt-out status are for illustrative purposes and should not be construed as exhaustive or limiting.

Example 1000 may include mobile web request 1004 and mobile tracking server 1006. Mobile tracking server 1006 may include mobile application profile store 1008, mobile web profile store 1010, and profile enrichment store 1012. Mobile application profile store 1008 may be an embodiment of mobile application profile store 908 of FIG. 9. Mobile web profile store 1010 may be an embodiment of mobile web profile store 910 of FIG. 9.

As illustrated, mobile web request 1004 may be received by mobile tracking server 1006. Statistical identifier A345 and client caching identifier L89 may be obtained or determined for mobile web request 1004. This statistical identifier and client caching identifier may be utilized to determine an entry in mobile web profile store 1010. In this illustration, Entry W2 corresponds to statistical identifier A345 and client caching identifier L89. As illustrated, Entry W2 may include an affirmative opt-out status (or flag). By employing embodiments described herein, profile enrichment store 1012, may be updated to purge categories associated with the statistical identifier for Entry W2. In some embodiments, mobile application profile store 1008 and mobile web profile store 1010 may be searched for and identify profiles that include the same statistical identifier and have a negative opt-out status. These identified profiles may be utilized to re-populate the statistical identifier in profile enrichment store 1012—such that previous categories of the opt-out profile are removed. In some embodiments (not shown), all categories in profile enrichment store 1012 may be removed for the statistical identifier. It should be recognized that the values for mobile tracking server UUIDs, statistical identifiers, categories, and opt-out status are for illustrative purposes and should not be construed as exhaustive or limiting.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A computer-implemented method, comprising:
monitoring, by a network computing device, one or more mobile application requests transmitted via one or more non-web browser mobile applications executing on a mobile client device;
analyzing, by the network computing device, the one or more mobile application requests to determine a first set of attributes that correspond to one or more characteristics associated with a user that submitted the one or more mobile application requests;
monitoring, by the network computing device, one or more web browsing requests transmitted via one or more web browsers executing on the mobile client device;
analyzing, by the network computing device, the one or more web browsing requests to determine a second set of attributes that correspond to one or more characteristics associated with a user that submitted the one or more web browsing requests;
determining, by the network computing device, one or more common attributes based on information shared by both the first set of attributes and the second set of attributes;
generating, by the network computing device and based on the common attributes, a first statistical identifier corresponding to the one or more mobile application requests transmitted via the one or more non-web browser mobile applications executing on the mobile client device;
generating, by the network computing device, a first universal unique identifier for the one or more mobile application requests, wherein the first universal unique identifier is derived from a device identifier corresponding to the mobile client device and is distinct from the first statistical identifier;

storing, in a mobile application profile store, a first record corresponding to the one or more mobile application requests, the first record comprising at least the first universal unique identifier, the first statistical identifier, and a first opt-out status indicator that indicates whether information associated with the first record should be stored in a profile enrichment store;

generating, by the network computing device and based on the common attributes, a second statistical identifier corresponding to the one or more web browsing requests transmitted via the one or more web browsers executing on the mobile client device;

generating, by the network computing device, a second universal unique identifier for the one or more web browsing requests, wherein the second universal unique identifier is a hash value generated based on the second statistical identifier and a caching identifier of the mobile client device;

storing, in a mobile web profile store, a second record corresponding to the one or more web browsing requests, the second record comprising at least the second universal unique identifier, the second statistical identifier, and a second opt-out status indicator that indicates whether information associated with the second record should be stored in the profile enrichment store;

determining, by the network computing device, that the first statistical identifier corresponds to the second statistical identifier;

in response to determining that the first statistical identifier corresponds to the second statistical identifier, storing a third record in the profile enrichment store, the third record integrating information retrieved from the first record of the mobile application profile store and information retrieved from the second record of the mobile web profile;

processing the first opt-out status indicator and the second opt-out status indicator to determine a removal of at least part of the information retrieved from the first record of the mobile application profile store and the second record of the mobile web profile store;

in response to determining the removal of the at least part of the information, removing, from the third record of the profile enrichment store, the at least part of the information retrieved from the first record of the mobile application profile store and the second record of the mobile web profile store;

receiving, by the network computing device, a content request transmitted via a non-web browser mobile application of a requesting client device;

analyzing, by the network computing device, the received content request to determine that the content request is associated with the same mobile client device;

in response to determining that the received content request is associated with the same mobile client device, retrieving, by the network computing device, the third record in the profile enrichment store;

determining, by the network computing device, one or more content resources based on at least part of the third record that indicates the information retrieved from the second record of the mobile web profile store; and transmitting, by the network computing device, the determined content resources to the requesting client device.

2. The computer-implemented method of claim 1, wherein analyzing the received content request comprises:
   determining a set of device characteristics associated with the requesting client device;
   generating a statistical identifier for the requesting client device, based on the device characteristics; and
   determining that the statistical identifier for the requesting client device corresponds to the first statistical identifier and/or the second statistical identifier.

3. The computer-implemented method of claim 2, wherein analyzing the received content request further comprises:
   in response to determining that the statistical identifier for the requesting device corresponds to the first statistical identifier and/or second statistical identifier, determining that the requesting client device is the same mobile client device.

4. The computer-implemented method of claim 1, wherein determining the one or more common attributes based on the information shared by both the first set of attributes and the second set of attributes comprises:
   determining, based on the first set of attributes, a first plurality of client device parameters of the mobile client device;
   determining, based on the second set of attributes, a second plurality of client device parameters of the mobile client device corresponding to the one or more web browsing requests; and
   determining the one or more common attributes based on information commonly retrievable from the first and the second plurality of the client device parameters.

5. The computer-implemented method of claim 1, further comprising:
   determining a first set of content categories based on the one or more mobile application requests;
   determining a second set of content categories based on the one or more web browsing requests;
   combining the first set of content categories and the second set of content categories; and
   storing the combined first and second sets of content categories as the third record of the profile enrichment store.

6. The computer-implemented method of claim 5, further comprising
   removing at least a part of the combined first and second sets of content categories of the third record.

7. The computer-implemented method of claim 1, further comprising:
   storing the first and second statistical identifiers in a cache of the corresponding mobile client device.

8. The computer-implemented method of claim 1,
   wherein the profile enrichment store is a data store separate from both the mobile application profile store and the mobile web profile store.

9. A system for integrating mobile application profiles and mobile web profiles, comprising:
   a plurality of client devices enabled to provide requests for content to network devices; and
   at least one network device, including:
   a memory for storing data and instructions; and
   a processor that executes the instructions to enable actions, including:
      monitoring, by a network computing device, one or more mobile application requests transmitted via one or more non-web browser mobile applications executing on a mobile client device;

analyzing, by the network computing device, the one or more mobile application requests to determine a first set of attributes that correspond to one or more characteristics associated with a user that submitted the one or more mobile application requests;

monitoring, by the network computing device, one or more mobile web browsing requests transmitted via one or more web browsers executing on the mobile client device;

analyzing, by the network computing device, the one or more web browsing requests to determine a second set of attributes that correspond to one or more characteristics associated with a user that submitted the one or more web browsing requests;

determining, by the network computing device, one or more common attributes based on information shared by both the first set of attributes and the second set of attributes;

generating, by the network computing device and based on the common attributes, a first statistical identifier corresponding to the one or more mobile application requests transmitted via the one or more non-web browser mobile applications executing on the mobile client device;

generating, by the network computing device, a first universal unique identifier for the one or more mobile application requests, wherein the first universal unique identifier is derived from a device identifier corresponding to the mobile client device and is distinct from the first statistical identifier;

storing, in a mobile application profile store, a first record corresponding to the one or more mobile application requests, the first record comprising at least the first universal unique identifier, the first statistical identifier, and a first opt-out status indicator that indicates whether information associated with the first record should be stored in a profile enrichment store;

generating, by the network computing device and based on the common attributes, a second statistical identifier corresponding to the one or more web browsing requests transmitted via the one or more web browsers executing on the mobile client device;

generating, by the network computing device, a second universal unique identifier for the one or more web browsing requests, wherein the second universal unique identifier is a hash value generated based on the second statistical identifier and a caching identifier of the mobile client device;

storing, in a mobile web profile store, a second record corresponding to the one or more web browsing requests, the second record comprising at least the second universal unique identifier, the second statistical identifier, and a second opt-out status indicator that indicates whether information associated with the second record should be stored in the profile enrichment store;

determining, by the network computing device, that the first statistical identifier corresponds to the second statistical identifier;

in response to determining that the first statistical identifier corresponds to the second statistical identifier, storing a third record in the profile enrichment store, the third record integrating information retrieved from the first record of the mobile application profile store and information retrieved from the second record of the mobile web profile store;

processing the first opt-out status indicator and the second opt-out status indicator to determine a removal of at least part of the information retrieved from the first record of the mobile application profile store and the second record of the mobile web profile store;

in response to determining the removal of the at least part of the information, removing, from the third record of the profile enrichment store, the at least part of the information retrieved from the first record of the mobile application profile store and the second record of the mobile web profile store;

receiving, by the network computing device, a content request transmitted via a non-web browser mobile application of a requesting client device;

analyzing, by the network computing device, the received content request to determine that the content request is associated with the same mobile client device;

in response to determining that the received content request is associated with the same mobile client device, retrieving, by the network computing device, the third record in the profile enrichment store;

determining, by the network computing device, one or more content resources based on at least part of the third record that indicates the information retrieved from the second record of the mobile web profile store; and transmitting, by the network computing device, the determined content resources to the requesting client device.

10. The system of claim 9, wherein analyzing the received content request comprises:
determining a set of device characteristics associated with the requesting client device;
generating a statistical identifier for the requesting client device, based on the device characteristics; and
determining that the statistical identifier for the requesting client device corresponds to the first statistical identifier and/or the second statistical identifier.

11. The system of claim 10, wherein analyzing the received content request further comprises:
in response to determining that the statistical identifier for the requesting device corresponds to the first statistical identifier and/or second statistical identifier, determining that the requesting client device is the same mobile client device.

12. The system of claim 9, wherein determining the one or more common attributes based on the information shared by both the first set of attributes and the second set of attributes comprises:
determining, based on the first set of attributes, a first plurality of client device parameters of the mobile client device;
determining, based on the second set of attributes, a second plurality of client device parameters of the mobile client device corresponding to the one or more web browsing requests; and
determining the one or more common attributes based on information commonly retrievable from the first and the second plurality of the client device parameters.

13. The system of claim 9, wherein the processor of the network device executes further instructions to enable additional actions, including:
determining a first set of content categories based on the one or more mobile application requests;

determining a second set of content categories based on the one or more web browsing requests;

combining the first set of content categories and the second set of content categories; and storing the combined first and second sets of content categories as the third record of the profile enrichment store.

14. The system of claim 13, wherein the processor of the network device executes further instructions to enable additional actions, including:

removing at least a part of the combined first and second sets of content categories of the third record.

15. The system of claim 9, wherein the processor of the network device executes further instructions to enable additional actions, including:

storing the first and second statistical identifier in a cache of the corresponding mobile client device.

16. The system of claim 9, wherein the profile enrichment store is a data store separate from both the mobile application profile data store and the mobile web profile data store.

17. A non-transitory computer-readable medium for integrating mobile application profiles and mobile web profiles, having sets of instructions stored thereon which, when executed by a network device cause the network device to:

monitor, by a network computing device, one or more mobile application requests transmitted via one or more non-web browser mobile applications executing on a mobile client device;

analyze, by the network computing device, the one or more mobile application requests to determine a first set of attributes that correspond to one or more characteristics associated with a user that submitted the one or more mobile application requests;

monitoring, by the network computing device, one or more web browsing requests transmitted via one or more web browsers executing on the mobile client device;

analyze, by the network computing device, the one or more web browsing requests to determine a second set of attributes that correspond to one or more characteristics associated with a user that submitted the one or more web browsing requests;

determining, by the network computing device, one or more common attributes based on information shared by both the first set of attributes and the second set of attributes;

generate, by the network computing device and based on the common attributes, a first statistical identifier corresponding to the one or more mobile application requests transmitted via the one or more non-web browser mobile applications executing on the mobile client device;

generate, by the network computing device, a first universal unique identifier for the one or more mobile application requests, wherein the first universal unique identifier is derived from a device identifier corresponding to the mobile client device and is distinct from the first statistical identifier;

store, in a mobile application profile store, a first record corresponding to the one or more mobile application requests, the first record comprising at least the first universal unique identifier, the first statistical identifier, and a first opt-out status indicator that indicates whether information associated with the first record should be stored in a profile enrichment store;

generate, by the network computing device and based on the common attributes, a second statistical identifier corresponding to the one or more web browsing requests transmitted via the one or more web browsers executing on the mobile client device;

generate, by the network computing device, a second universal unique identifier for the one or more web browsing requests, wherein the second universal unique identifier is a hash value generated based on the second statistical identifier and a caching identifier of the mobile client device;

store, in a mobile web profile store, a second record corresponding to the one or more web browsing requests, the second record comprising at least the second universal unique identifier, the second statistical identifier, and a second opt-out status indicator that indicates whether information associated with the second record should be stored in the profile enrichment store;

determine, by the network computing device, that the first statistical identifier corresponds to the second statistical identifier;

in response to determining that the first statistical identifier corresponds to the second statistical identifier, store a third record in the profile enrichment store, the third record integrating information retrieved from the first record of the mobile application profile store and information retrieved from the second record of the mobile web profile store;

process the first opt-out status indicator and the second opt-out status indicator to determine a removal of at least part of the information retrieved from the first record of the mobile application profile store and the second record of the mobile web profile store;

in response to determining the removal of the at least part of the information, remove, from the third record of the profile enrichment store, the at least part of the information retrieved from the first record of the mobile application profile store and the second record of the mobile web profile store;

receive, by the network computing device, a content request transmitted via a non-web browser mobile application of a requesting client device;

analyze, by the network computing device, the received content request to determine that the content request is associated with the same mobile client device;

in response to determining that the received content request is associated with the same mobile client device, retrieve, by the network computing device, the third record in the profile enrichment store;

determine, by the network computing device, one or more content resources based on at least part of the third record that indicates the information retrieved from the second record of the mobile web profile store; and transmit, by the network computing device, the determined content resources to the requesting client device.

18. The non-transitory computer-readable medium of claim 17, wherein analyzing the received content request comprises:

determining a set of device characteristics associated with the requesting client device;

generating a statistical identifier for the requesting client device, based on the device characteristics; and determining that the statistical identifier for the requesting client device corresponds to the first statistical identifier and/or the second statistical identifier.

19. The non-transitory computer-readable medium of claim 18, wherein analyzing the received content request further comprises:

in response to determining that the statistical identifier for the requesting device corresponds to the first statistical identifier and/or second statistical identifier, determining that the requesting client device is the same mobile client device.

20. The non-transitory computer-readable medium of claim 17, wherein determining the one or more common attributes based on the information shared by both the first set of attributes and the second set of attributes comprises:

determining, based on the first set of attributes, a first plurality of client device parameters of the mobile client device;

determining, based on the second set of attributes, a second plurality of client device parameters of the mobile client device corresponding to the one or more web browsing requests; and determining the one or more common attributes based on information commonly retrievable from the first and the second plurality of the client device parameters.

21. The non-transitory computer-readable medium of claim 17, having further instructions stored thereon which, when executed by the network device cause the network device to:

determine a first set of content categories based on the one or more mobile application requests;

determine a second set of content categories based on the one or more web browsing requests;

combine the first set of content categories and the second set of content categories; and store the combined first and second sets of content categories as the third record of the profile enrichment store.

22. The non-transitory computer-readable medium of claim 21, having further instructions stored thereon which, when executed by the network device cause the network device to:

remove at least a part of the combined first and second sets of content categories of the third record.

23. The non-transitory computer-readable medium of claim 17, having further instructions stored thereon which, when executed by the network device cause the network device to:

store the first and second statistical identifier in a cache of the corresponding mobile client device.

24. The non-transitory computer-readable medium of claim 17, wherein the profile enrichment store is a data store separate from both the mobile application profile store and the mobile web profile store.

* * * * *